US012571439B2

(12) United States Patent
Lee et al.

(10) Patent No.: US 12,571,439 B2
(45) Date of Patent: Mar. 10, 2026

(54) CALIPER BRAKE

(71) Applicant: HL MANDO CORPORATION, Pyeongtaek-si (KR)

(72) Inventors: Yunseong Lee, Yongin-si (KR); Kibae Song, Anyang-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 879 days.

(21) Appl. No.: 17/721,815

(22) Filed: Apr. 15, 2022

(65) Prior Publication Data

US 2022/0333654 A1 Oct. 20, 2022

(30) Foreign Application Priority Data

| Apr. 20, 2021 | (KR) | ......................... | 10-2021-0051144 |
| Jul. 1, 2021 | (KR) | ......................... | 10-2021-0086640 |
| Aug. 12, 2021 | (KR) | ......................... | 10-2021-0106782 |

(51) Int. Cl.
    *F16D 55/227* (2006.01)
    *F16D 55/2265* (2006.01)
    (Continued)

(52) U.S. Cl.
    CPC ..... *F16D 55/227* (2013.01); *F16D 55/22655* (2013.01); *F16D 65/0075* (2013.01);
    (Continued)

(58) Field of Classification Search
    CPC ............. F16D 55/227; F16D 55/22655; F16D 65/0075; F16D 65/0087; F16D 65/0978;
    (Continued)

(56) References Cited

U.S. PATENT DOCUMENTS

| 10,030,723 | B1 * | 7/2018 | Liao | .................... | F16D 65/0075 |
| 10,760,630 | B2 * | 9/2020 | Liao | .................... | F16D 65/0087 |
| | | | | (Continued) | |

FOREIGN PATENT DOCUMENTS

| CN | 211343802 U | 8/2020 | | |
| DE | 202018003848 U1 * | 10/2018 | ......... | F16D 55/2262 |
| | | (Continued) | | |

OTHER PUBLICATIONS

CN OA dated Dec. 21, 2023.
(Continued)

*Primary Examiner* — Robert A. Siconolfi
*Assistant Examiner* — Mahbubur Rashid
(74) *Attorney, Agent, or Firm* — Harvest IP Law, LLP

(57) ABSTRACT

Disclosed herein a caliper brake includes a brake disc rotating with a wheel of a vehicle; an inner brake pad and an outer brake pad respectively disposed on opposite sides of the brake disc; a pressing member configured to press the inner brake pad against the brake disc; a caliper housing in which the pressing member is movable forward and backward; a caliper bridge connected to the caliper housing and configured to press the outer brake pad against the brake disc by a reaction force in response to operation of the pressing member; a carrier fixed to a body of the vehicle; and at least one guide rod fixed to the carrier and guiding sliding movement of the caliper housing and the caliper bridge with respect to the carrier.

12 Claims, 40 Drawing Sheets

1

(51) Int. Cl.

| | |
|---|---|
| *F16D 65/00* | (2006.01) |
| *F16D 65/097* | (2006.01) |
| *B60R 13/00* | (2006.01) |
| *F16D 55/00* | (2006.01) |
| *F16D 127/02* | (2012.01) |

(52) U.S. Cl.
CPC ..... *F16D 65/0087* (2013.01); *F16D 65/0978* (2013.01); *B60R 13/005* (2013.01); *F16D 2055/0008* (2013.01); *F16D 2055/002* (2013.01); *F16D 2127/02* (2013.01)

(58) Field of Classification Search
CPC ....... F16D 2055/0008; F16D 2055/002; F16D 2127/02; F16D 59/02; F16D 55/40; F16D 55/226; F16D 55/28; F16D 65/0972; F16D 65/0979; F16D 55/32; F16D 65/186; F16D 65/0977; F16D 65/097; F16D 65/0975; F16D 2055/0029; F16D 2127/06; F16D 2055/0041; F16D 2055/007; F16D 55/02; F16D 2055/0016; F16D 55/2262; F16D 2065/1396; F16D 55/2265; F16D 65/0068; F16D 55/00; F16D 65/0971; F16D 2121/06; F16D 55/225; F16D 65/0976; F16D 65/28; F16D 65/84; F16D 67/04; F16D 13/69; F16D 2065/1348; F16D 55/24; F16D 2125/582; F16D 13/583; F16D 2125/08; F16D 65/122; F16D 13/585; F16D 2055/0037; F16D 2121/005; F16D 2121/10; F16D 2121/34; F16D 2125/565; F16D 23/14; F16D 25/126; F16D 65/0081; B60R 13/005

See application file for complete search history.

(56) References Cited

U.S. PATENT DOCUMENTS

| | | | | |
|---|---|---|---|---|
| 2007/0051568 | A1* | 3/2007 | Barbosa | F16D 55/227 |
| | | | | 188/73.45 |
| 2014/0110196 | A1* | 4/2014 | Burgoon | B60T 13/22 |
| | | | | 188/72.3 |
| 2014/0367208 | A1* | 12/2014 | Miyake | F16D 55/227 |
| | | | | 188/72.3 |
| 2016/0076612 | A1 | 3/2016 | Merrien | |
| 2020/0080601 | A1 | 3/2020 | Liao | |

FOREIGN PATENT DOCUMENTS

| | | | |
|---|---|---|---|
| JP | 2012202528 | A | 10/2012 |
| KR | 10-2013-0084031 | A | 7/2013 |
| KR | 10-1796492 | B1 | 12/2017 |
| KR | 20170139879 | A * | 12/2017 |

OTHER PUBLICATIONS

Office Action From Korean Patent Office Dated Nov. 11, 2025, Issued for Korean Patent Application No. 10-2021-0086640.
Office Action From Korean Patent Office Dated Nov. 13, 2025, Issued for Korean Patent Application No. 10-2021-0106782.

* cited by examiner

【Fig. 1】
1
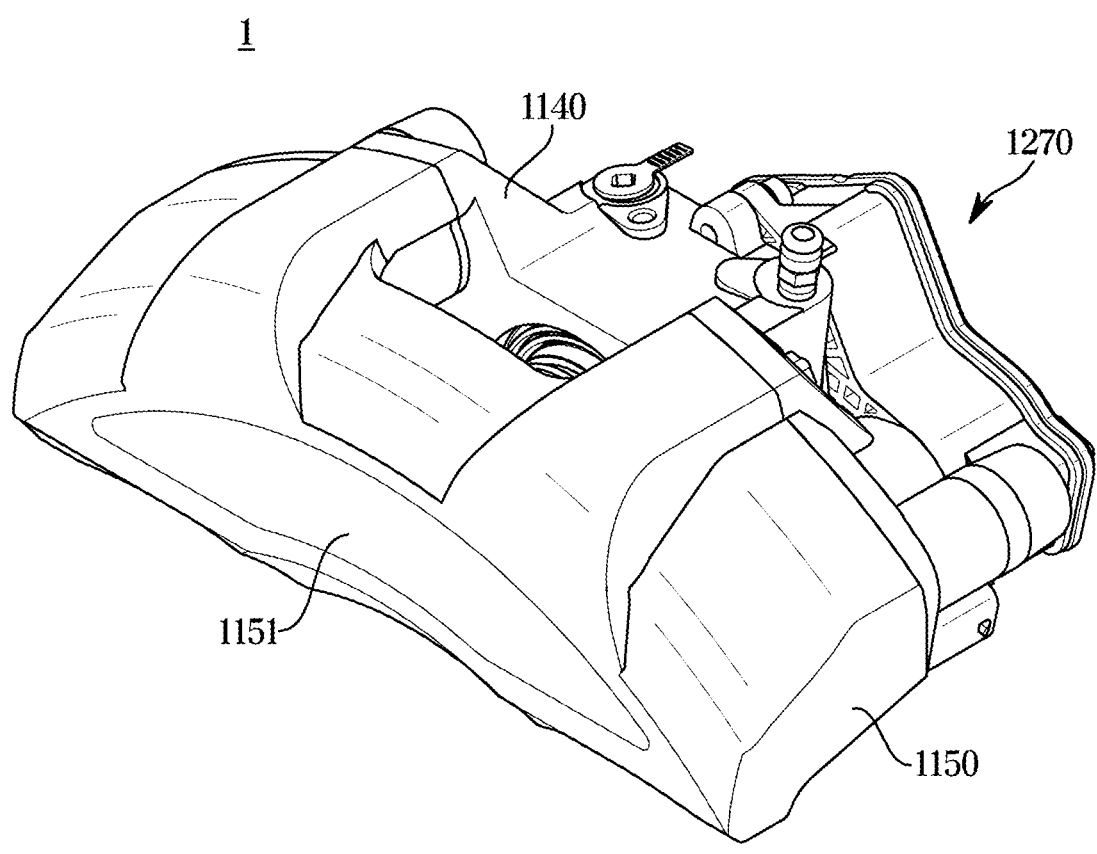

【Fig. 2】
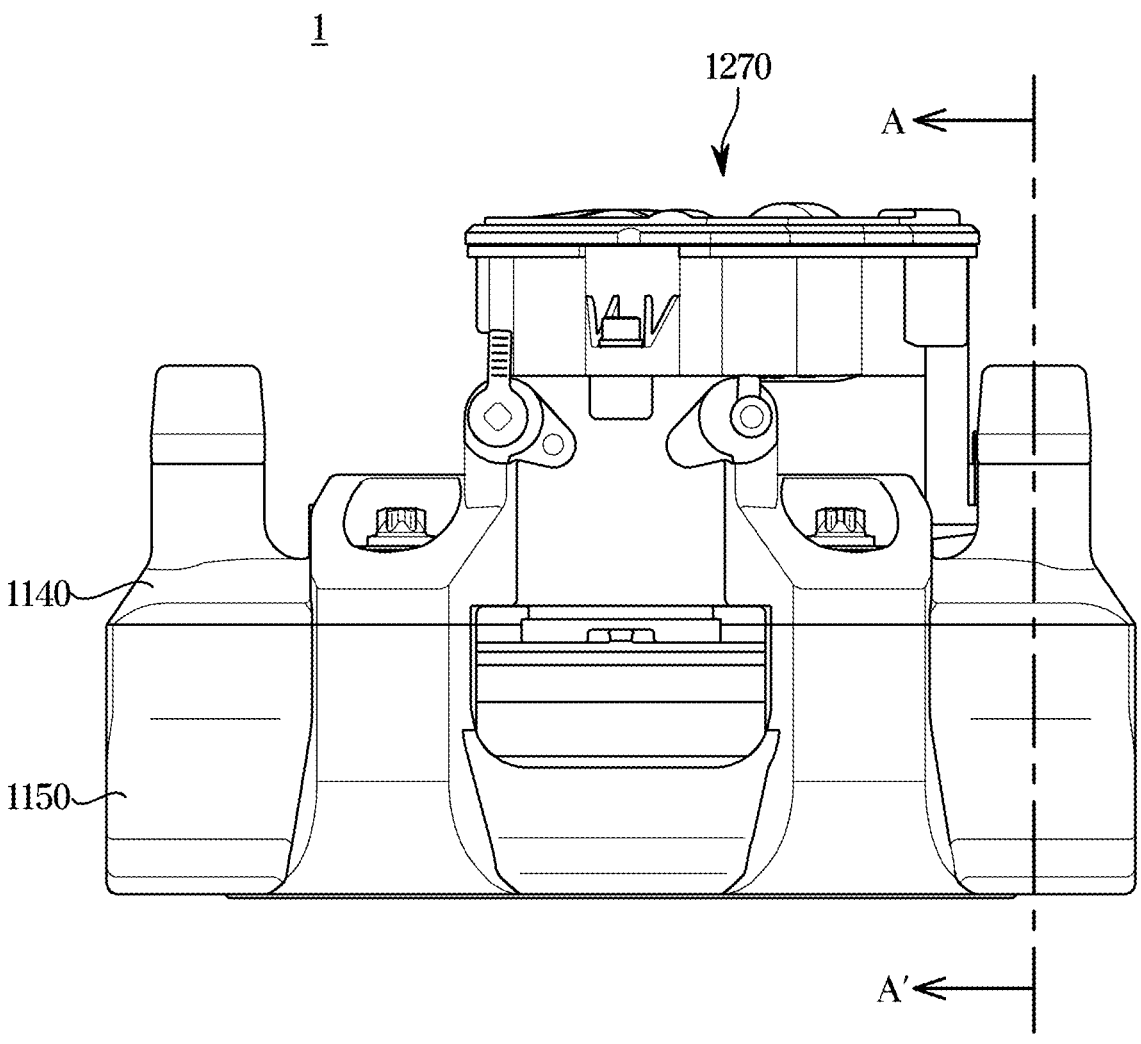

[Fig. 3]
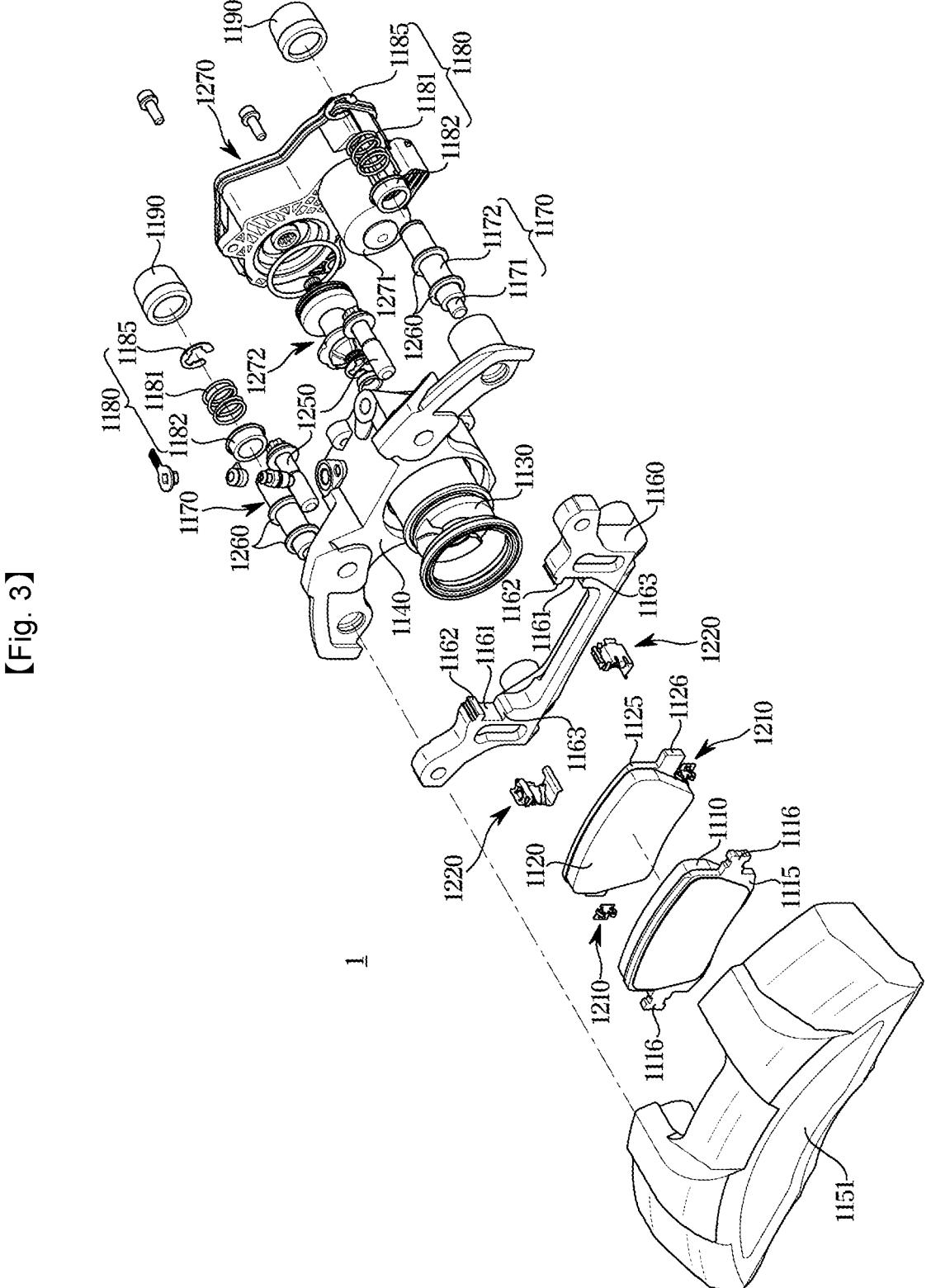

[Fig. 4]
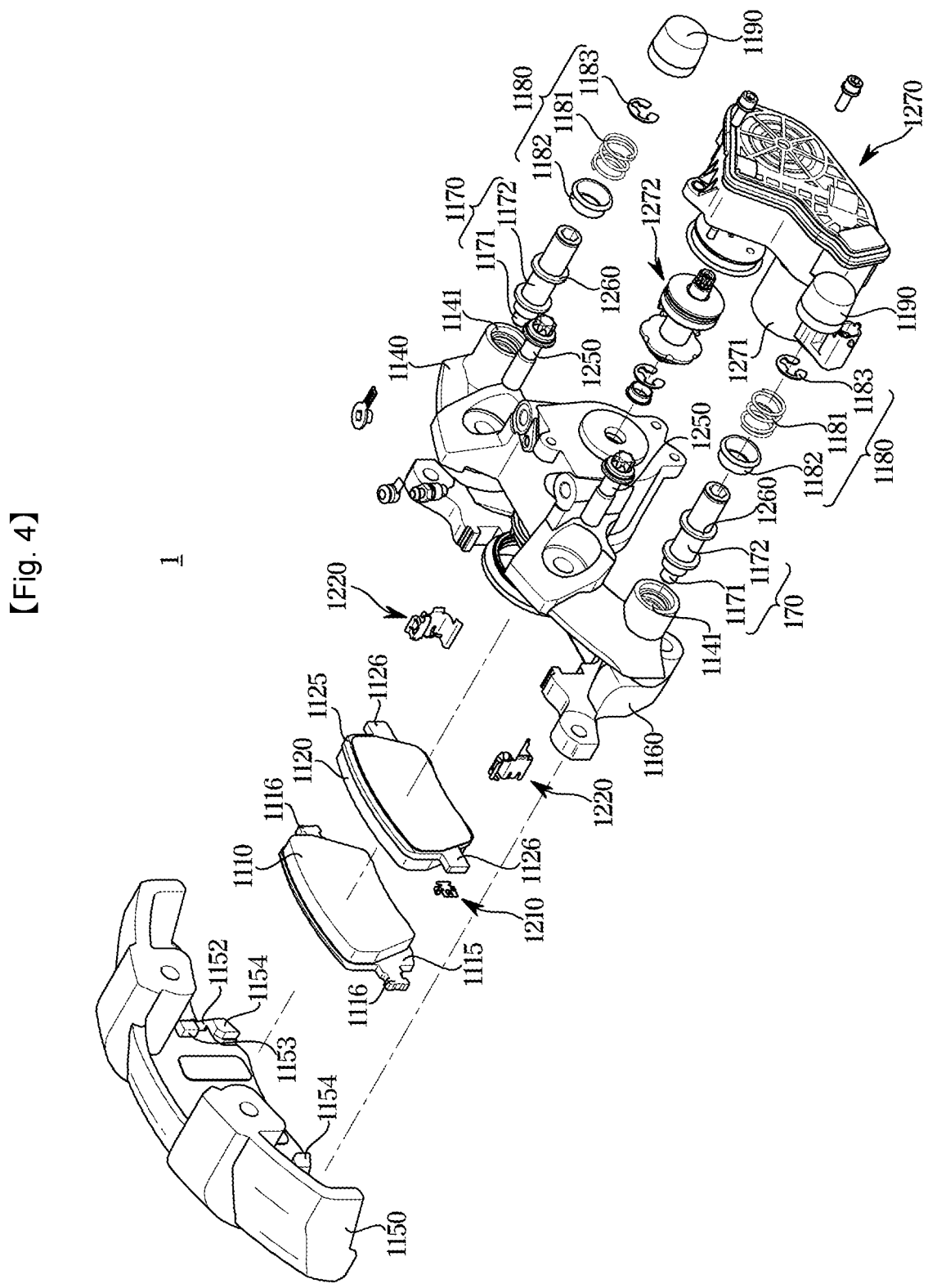

【Fig. 5】
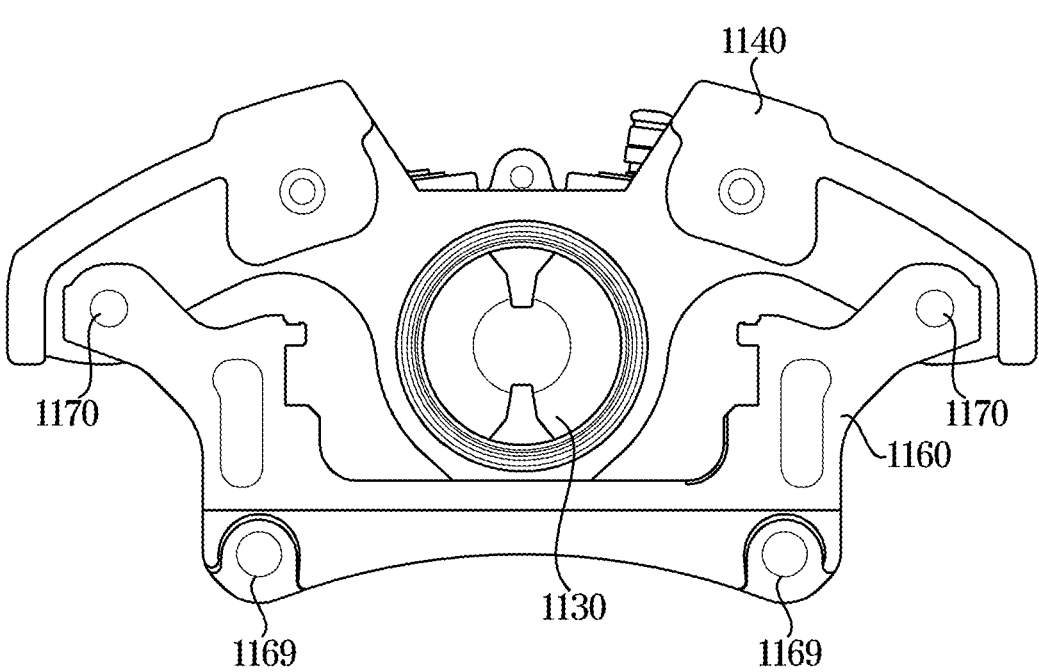

【Fig. 6】
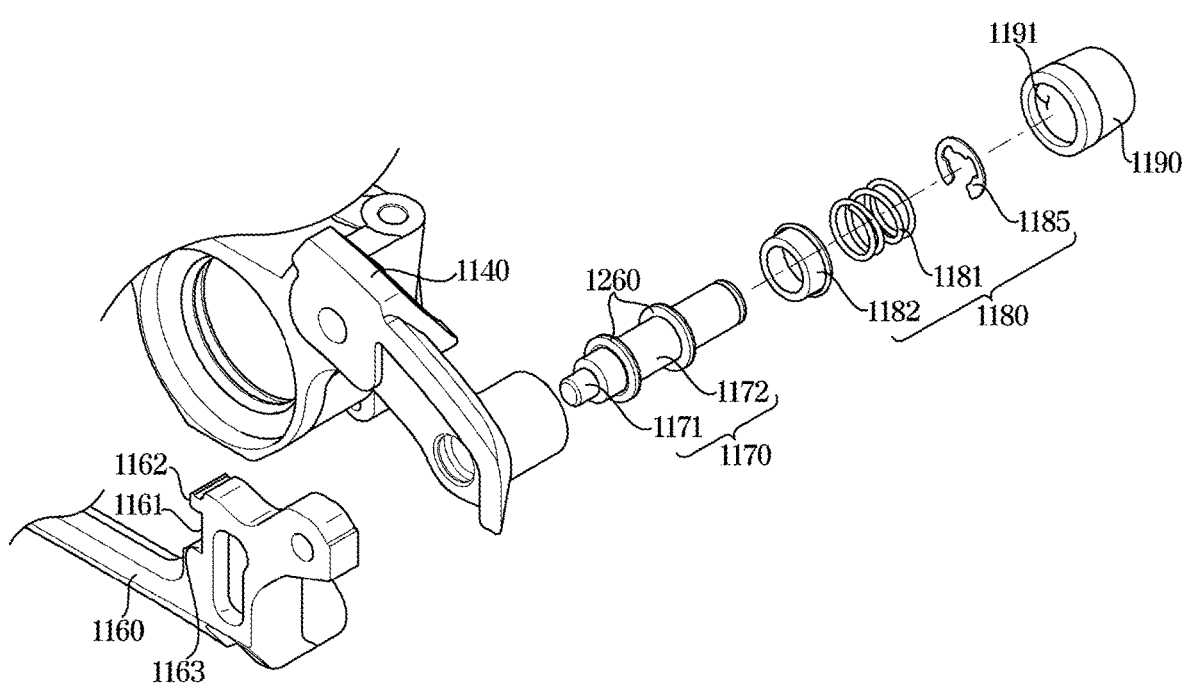

【Fig. 7】
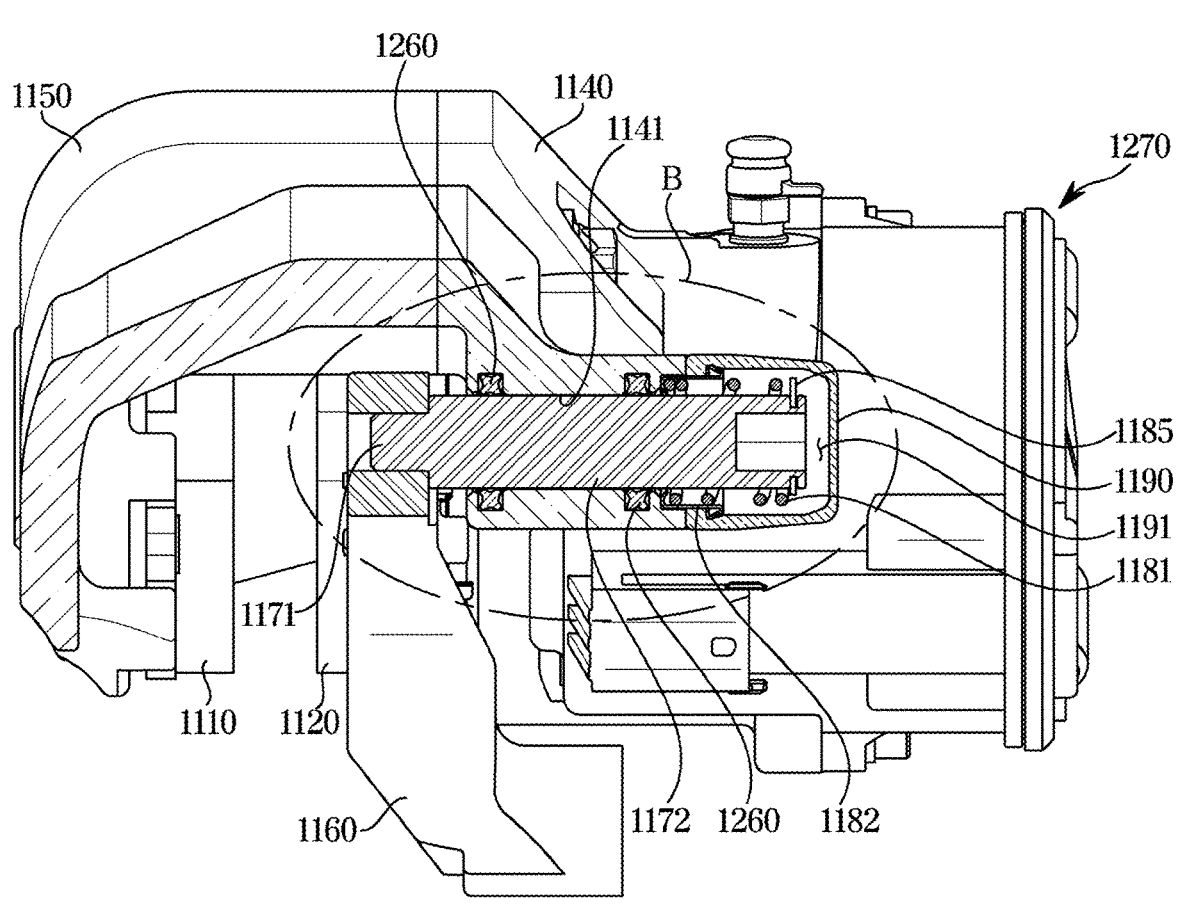

【Fig. 8】
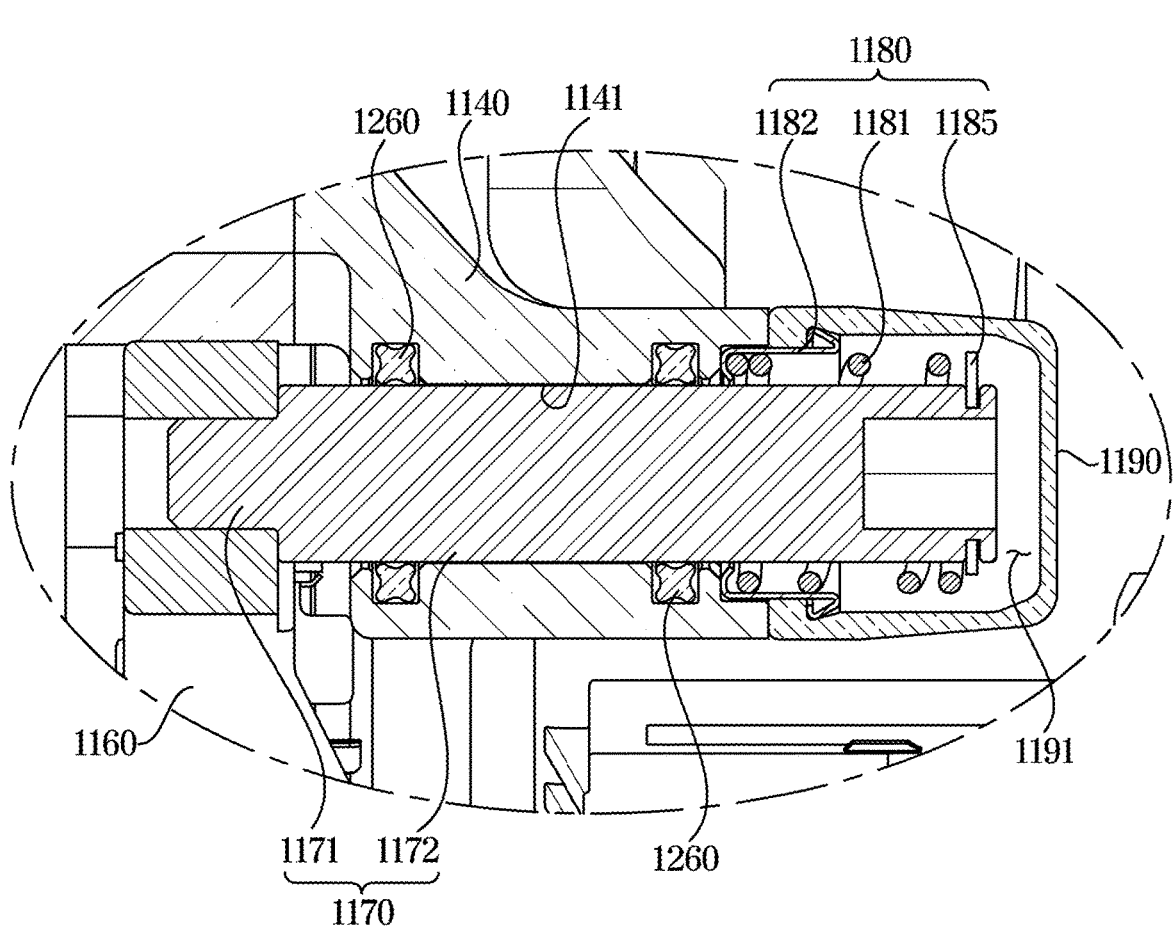

【Fig. 9】
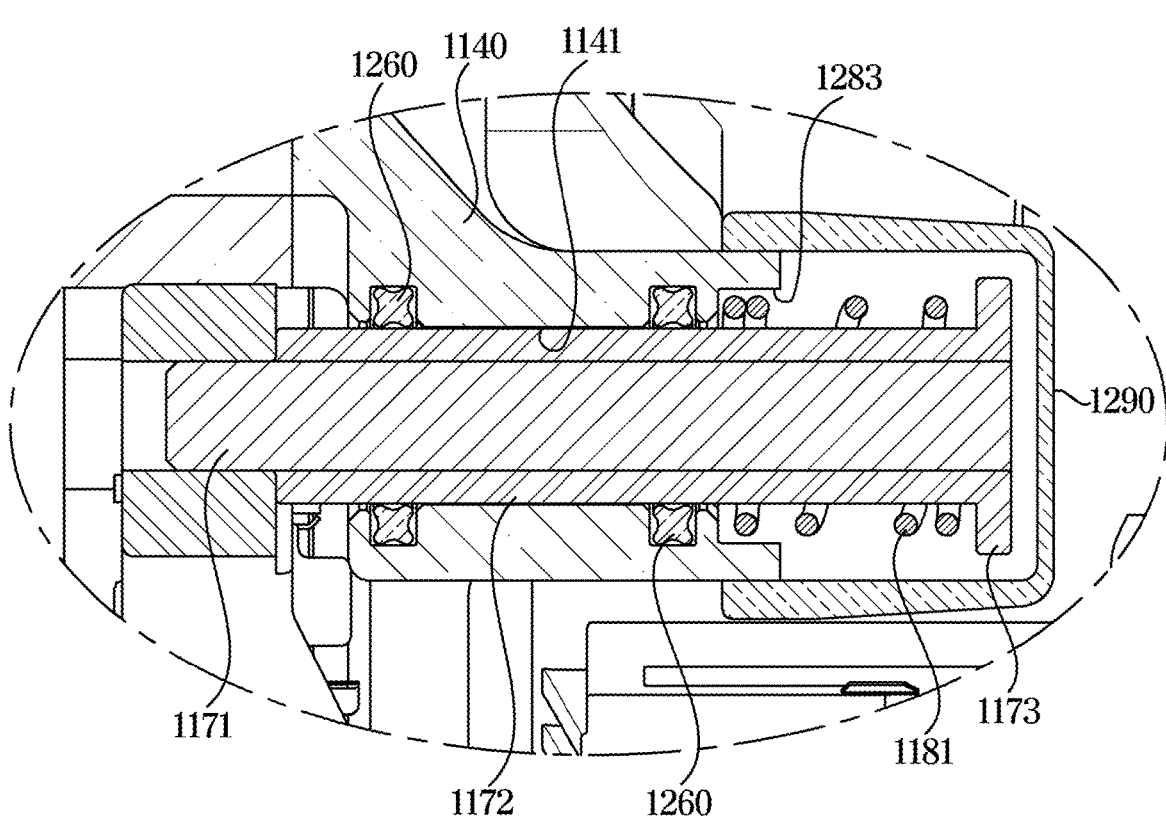

【Fig. 10】
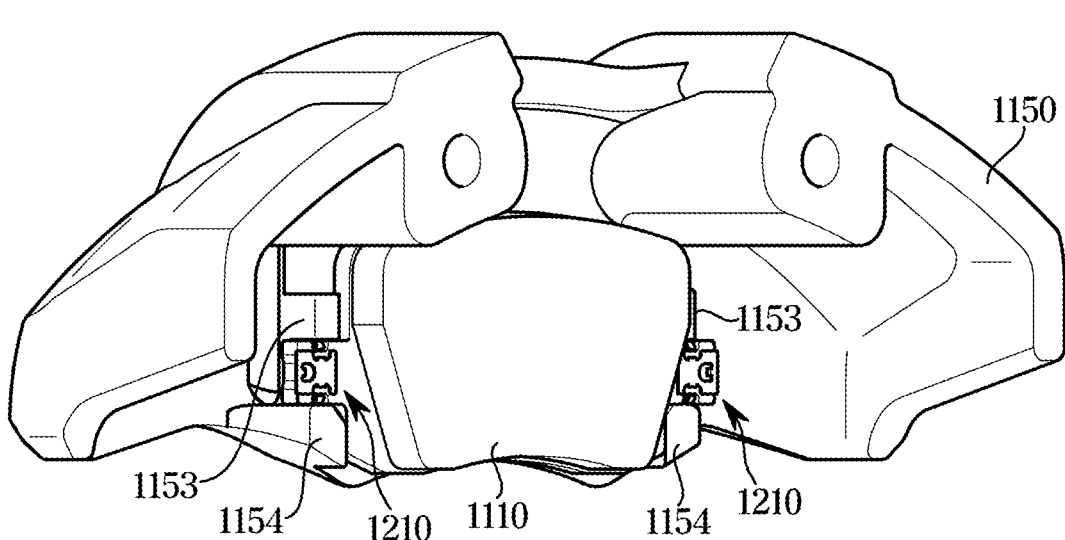

【Fig. 11】
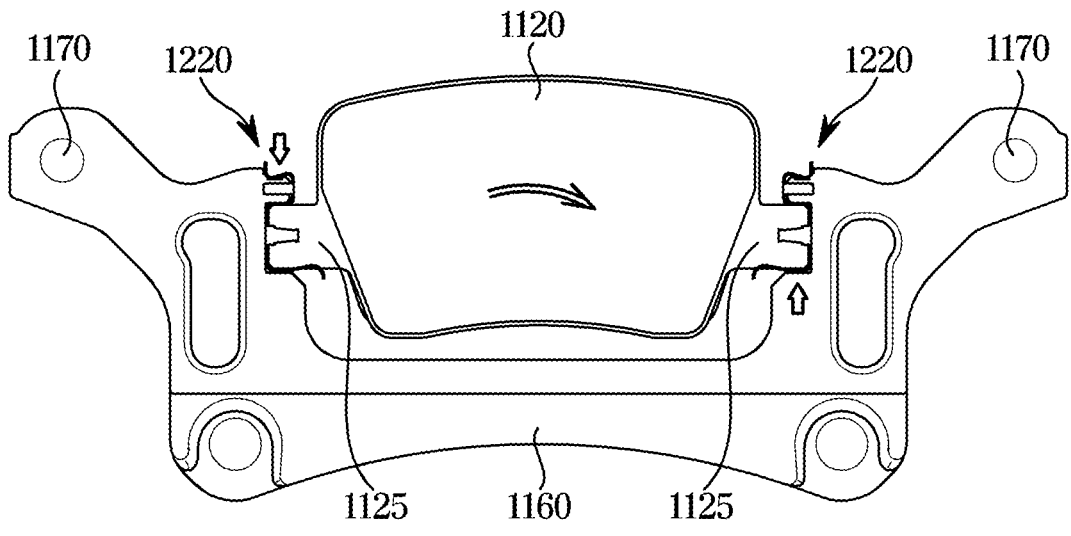
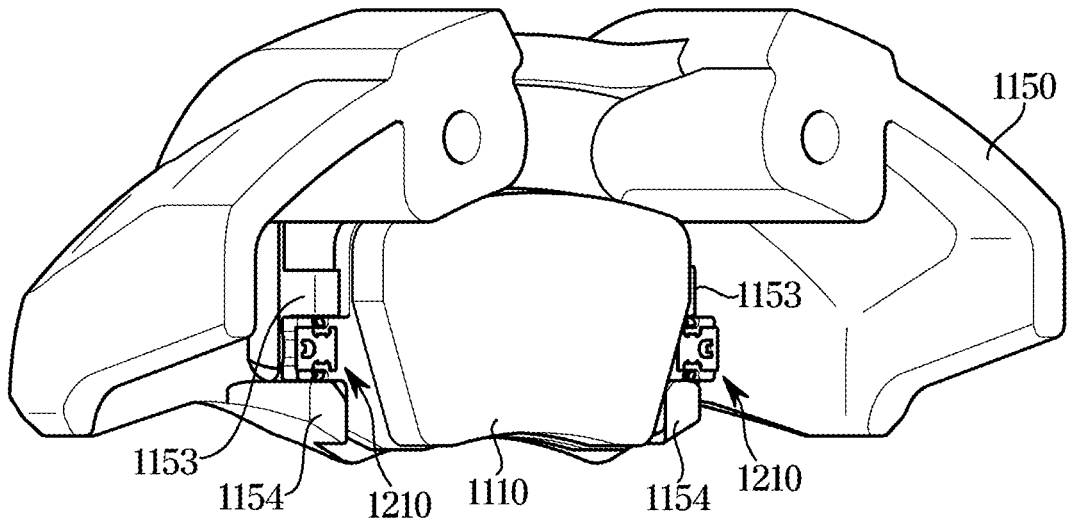

【Fig. 12】
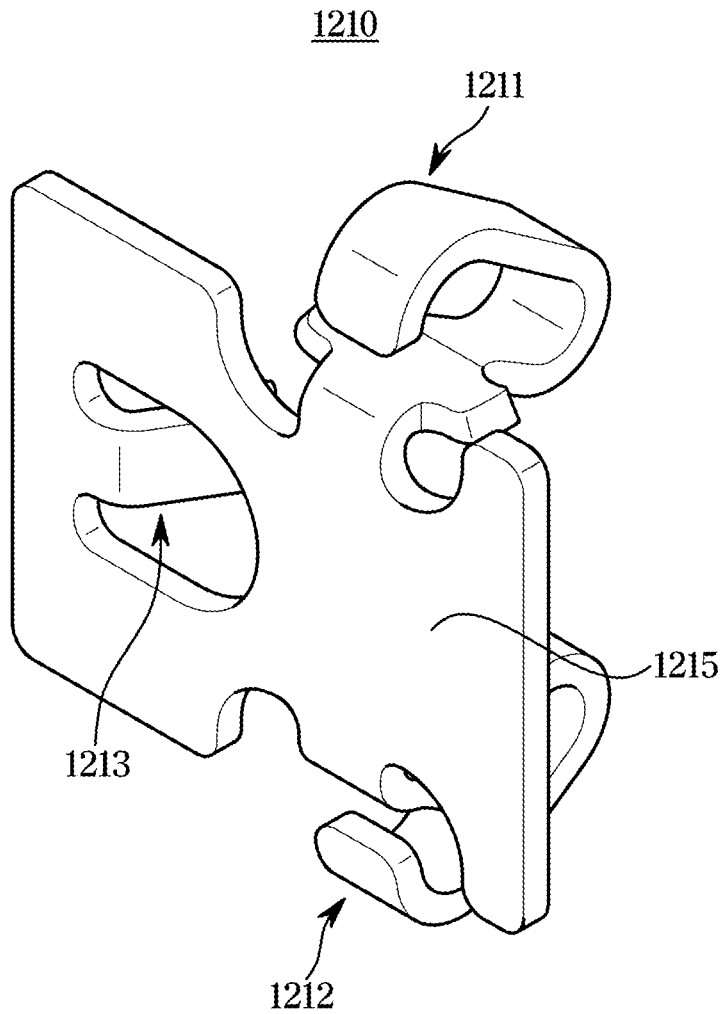

【Fig. 13】
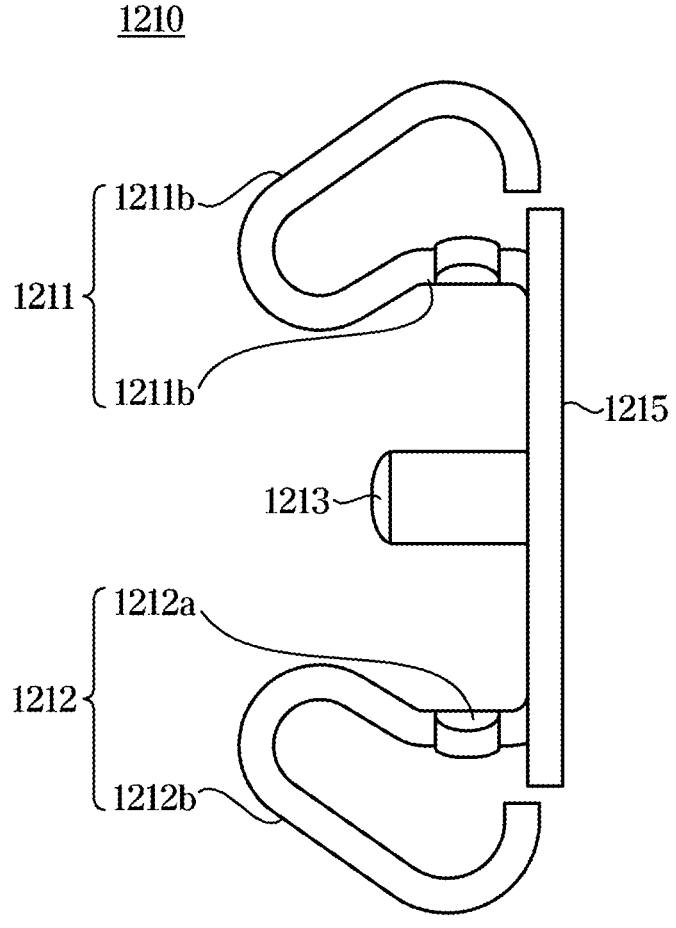

【Fig. 14】
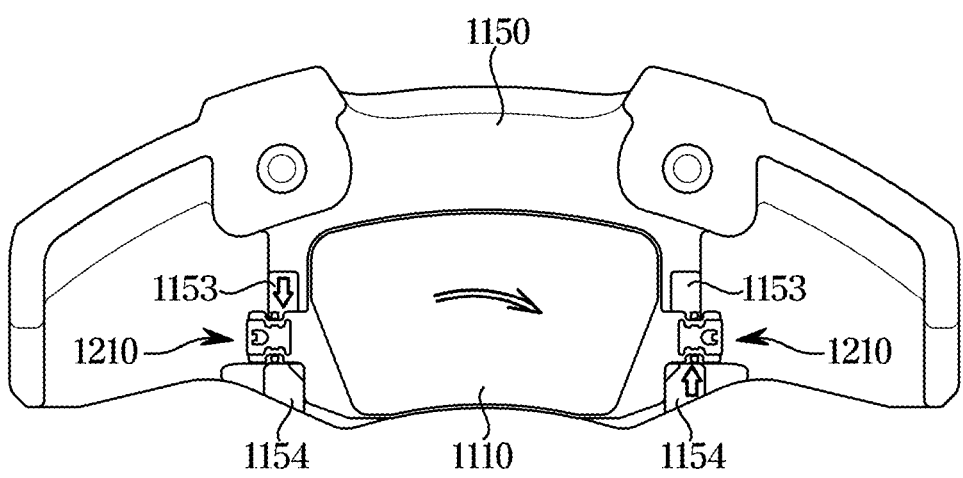

【Fig. 15】
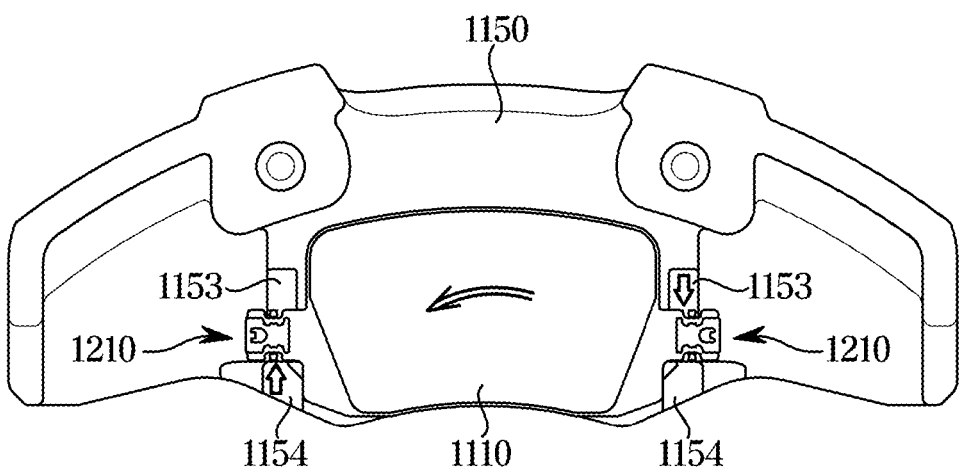

【Fig. 16】
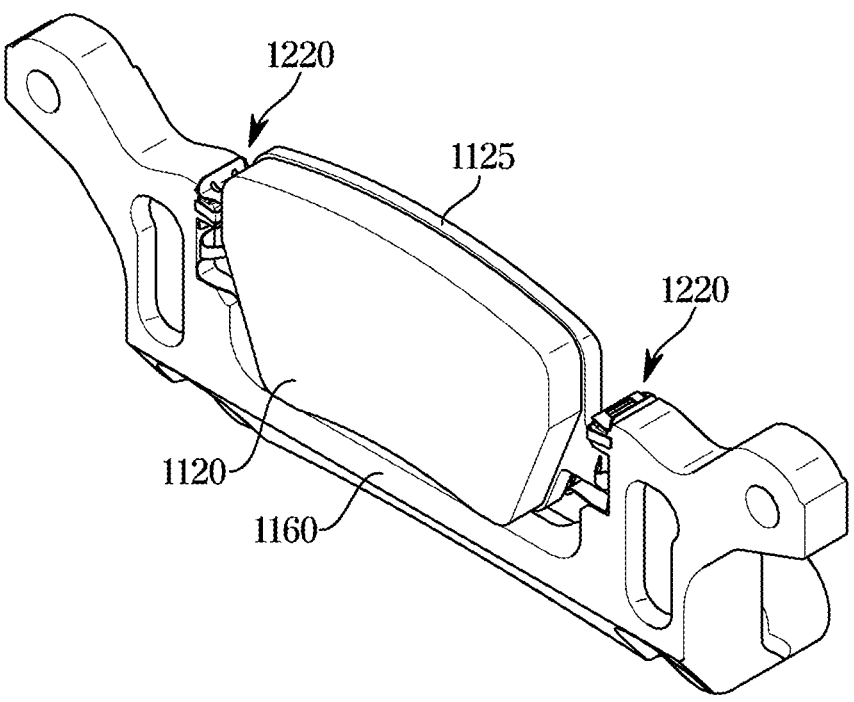

【Fig. 17】
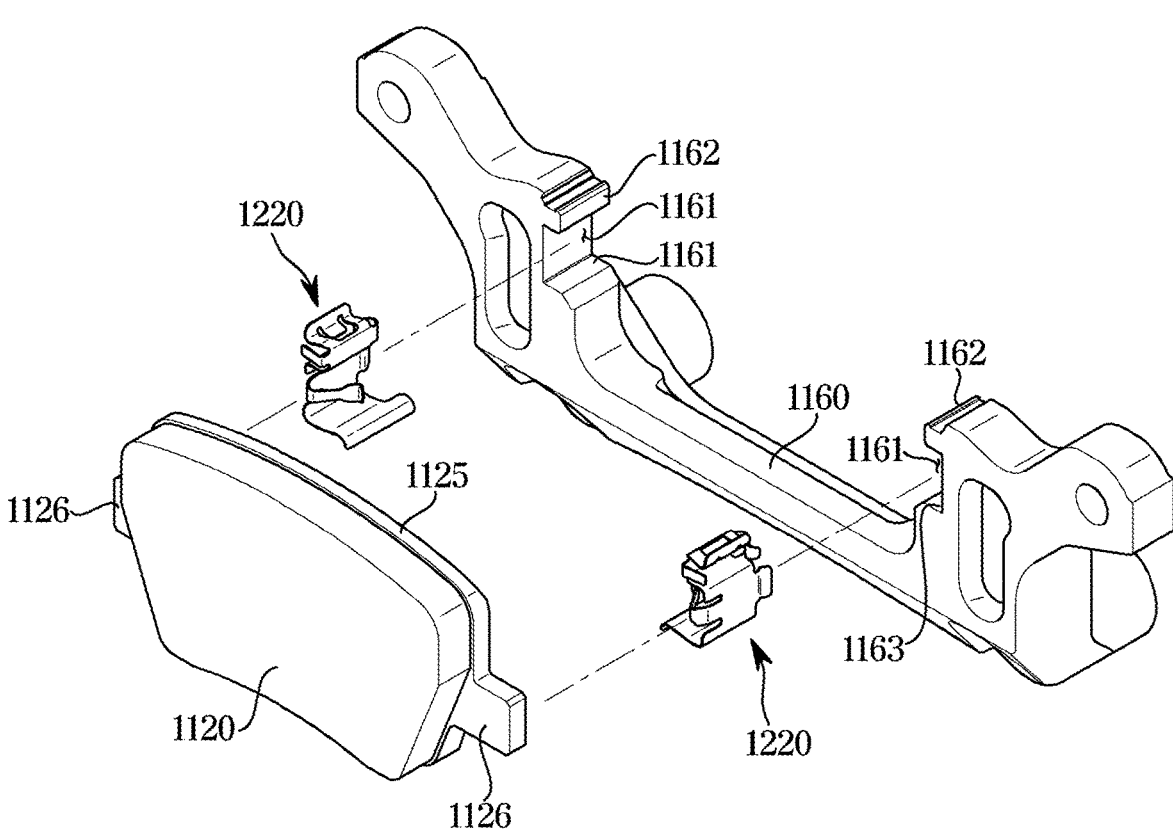

【Fig. 18】
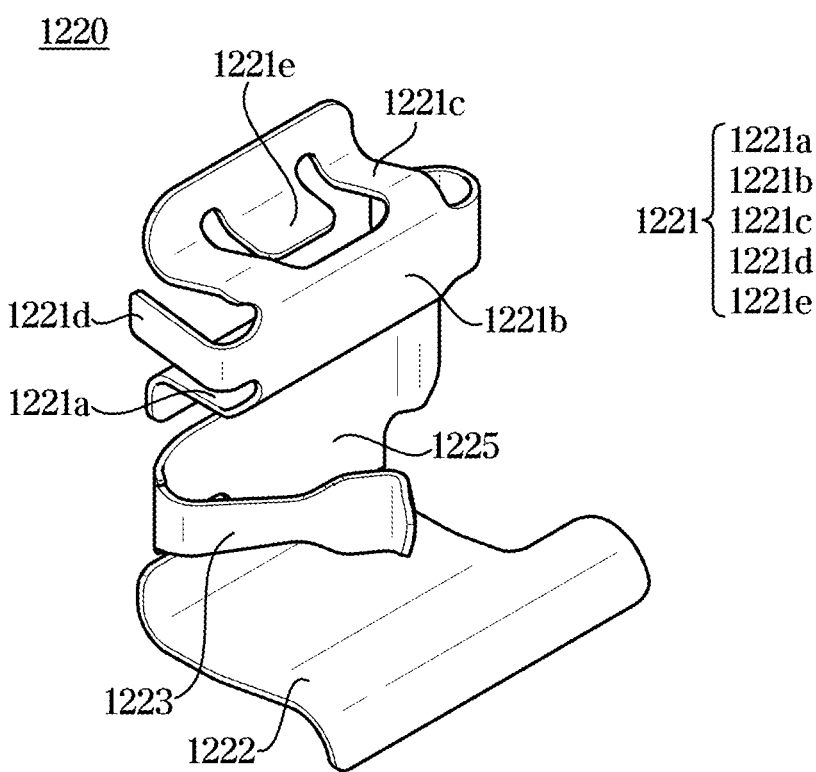

【Fig. 19】
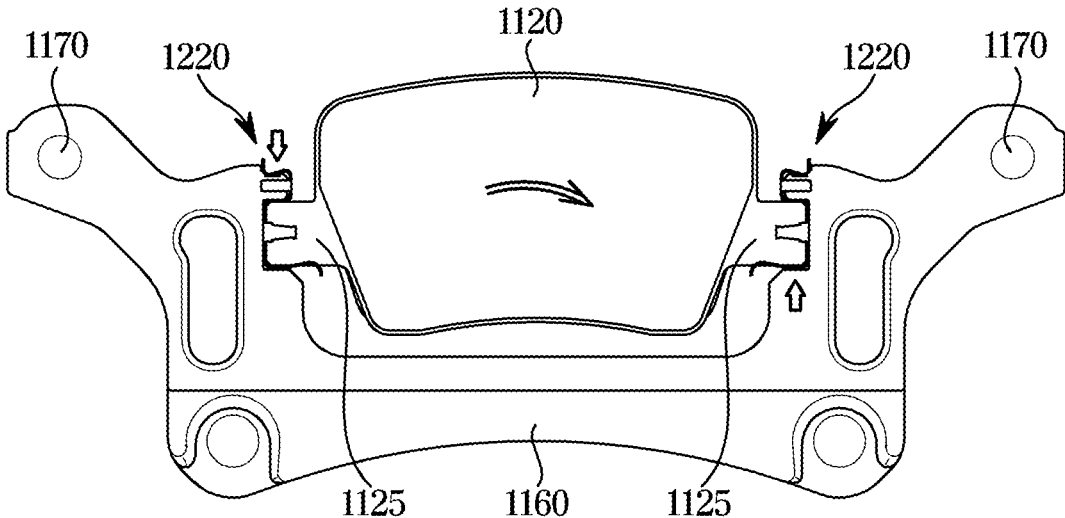

【Fig. 20】
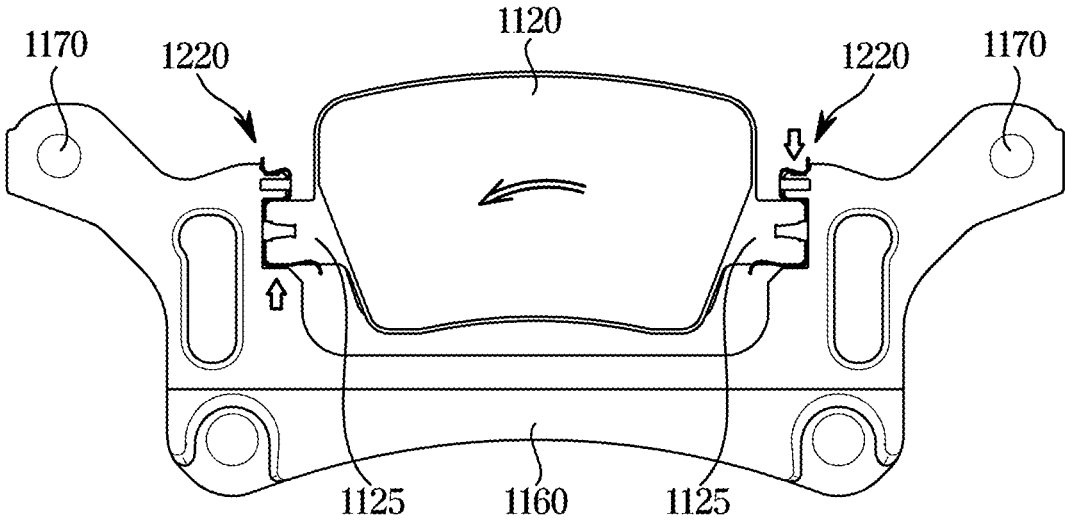

【Fig. 21】
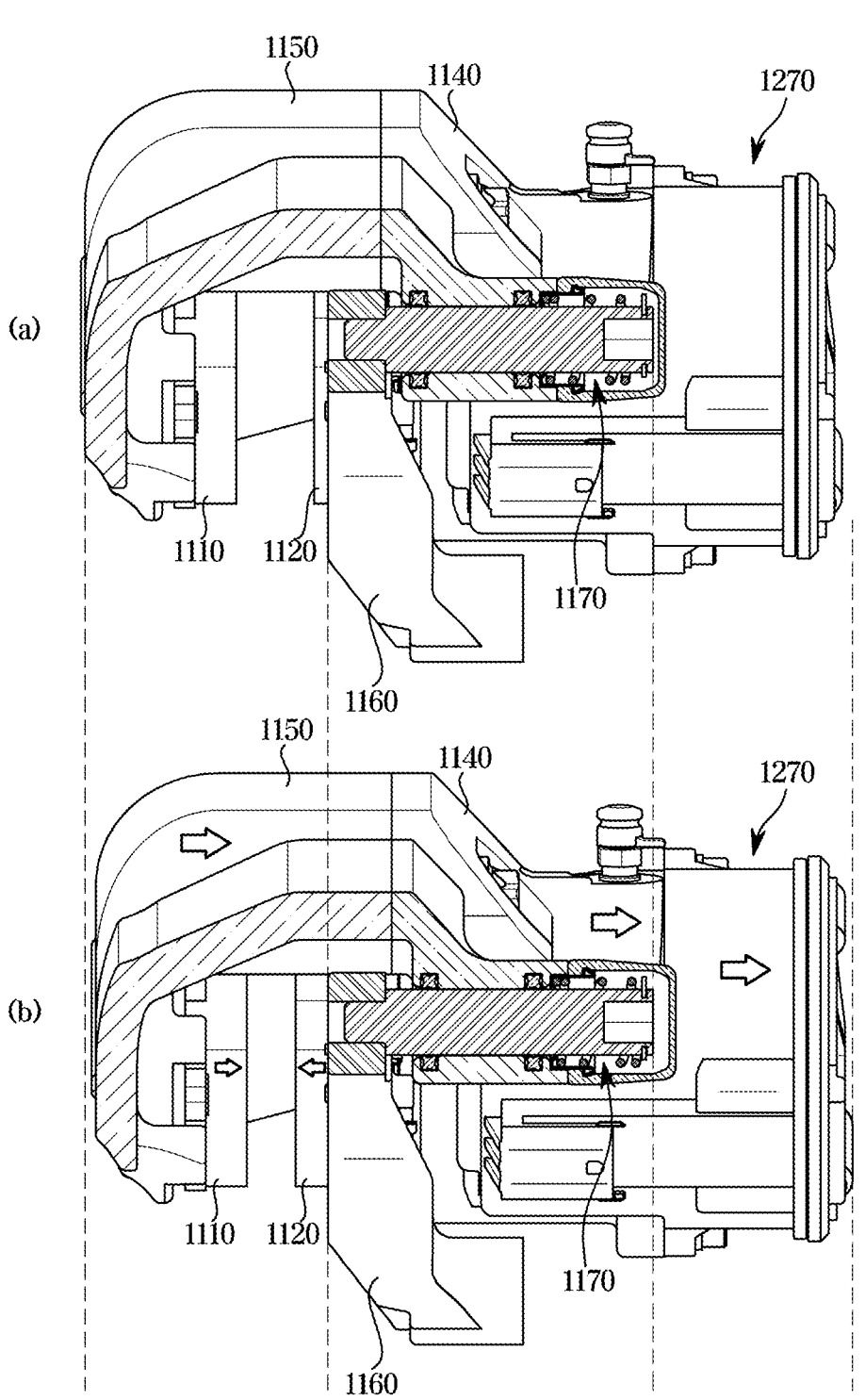

[Fig. 22]
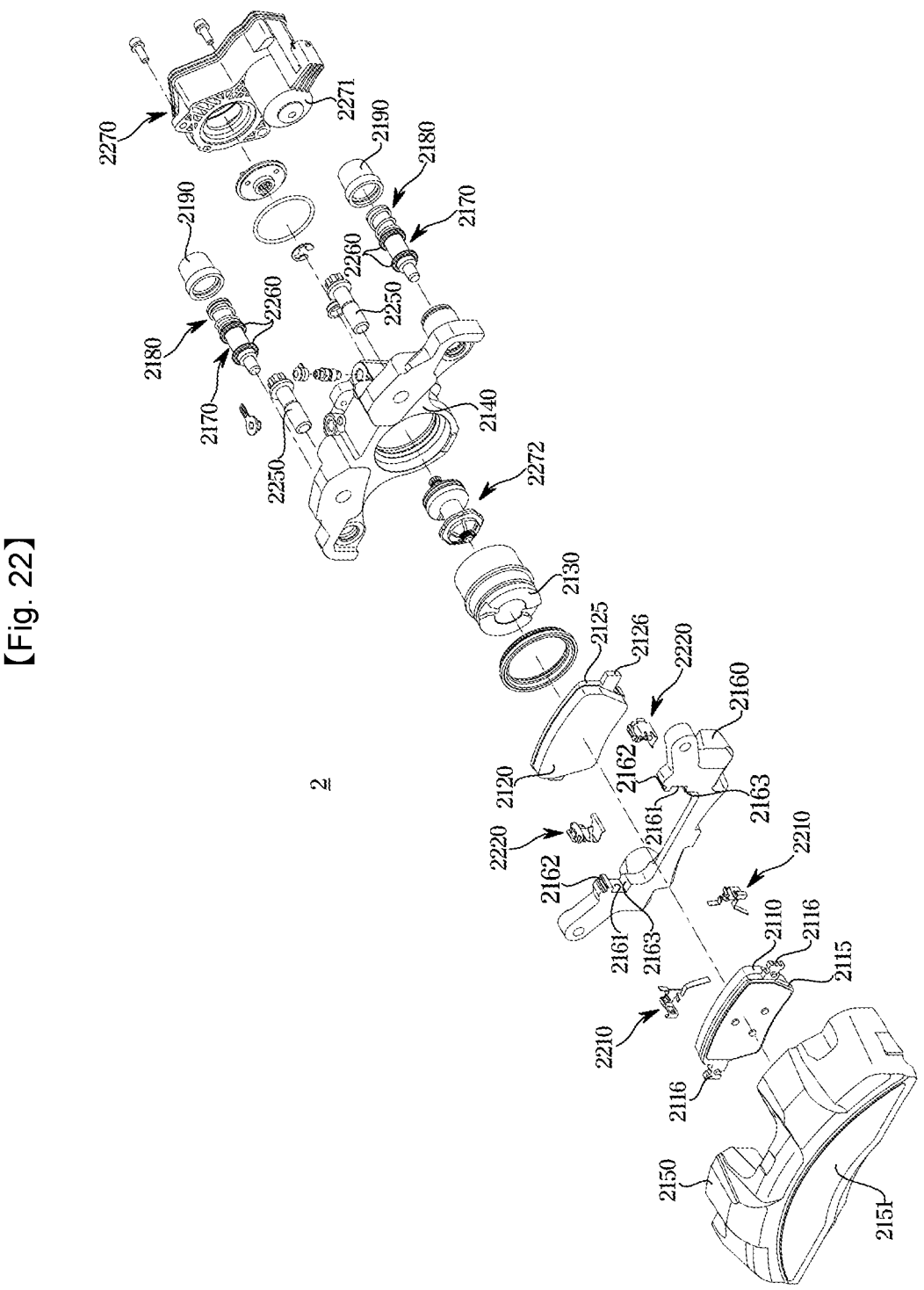

[Fig. 23]
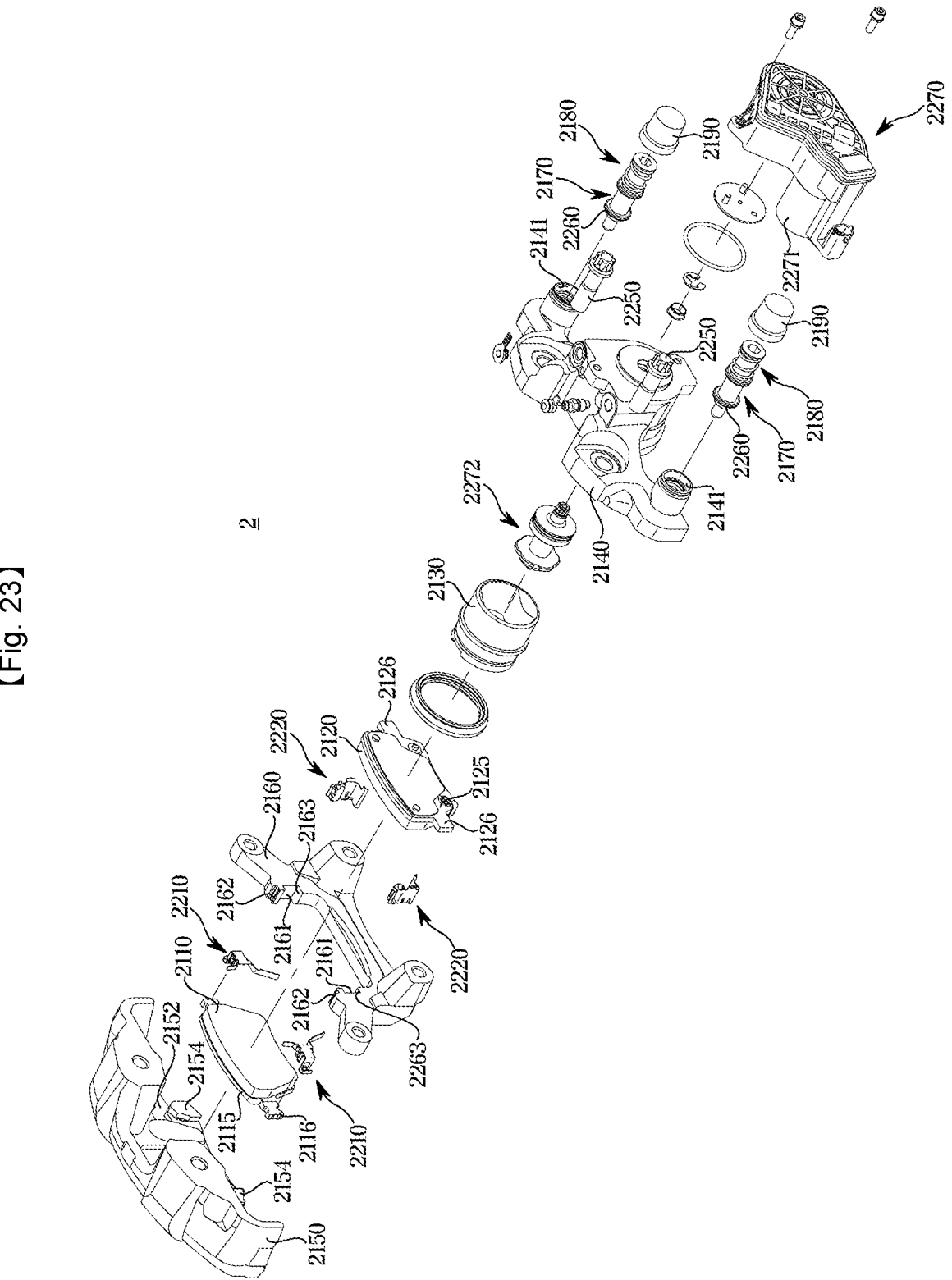

【Fig. 24】
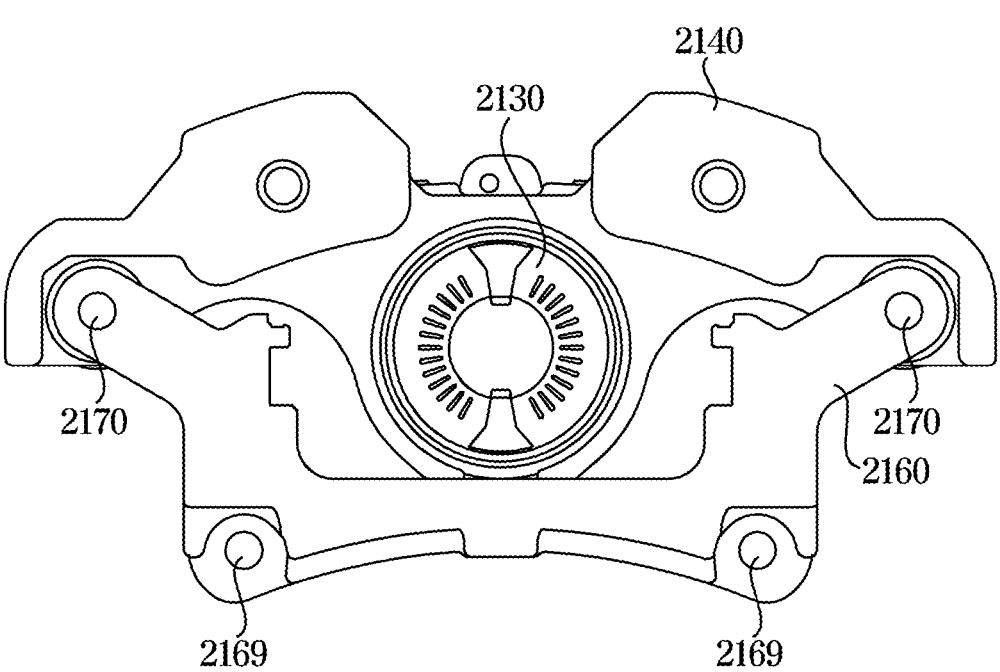

【Fig. 25】
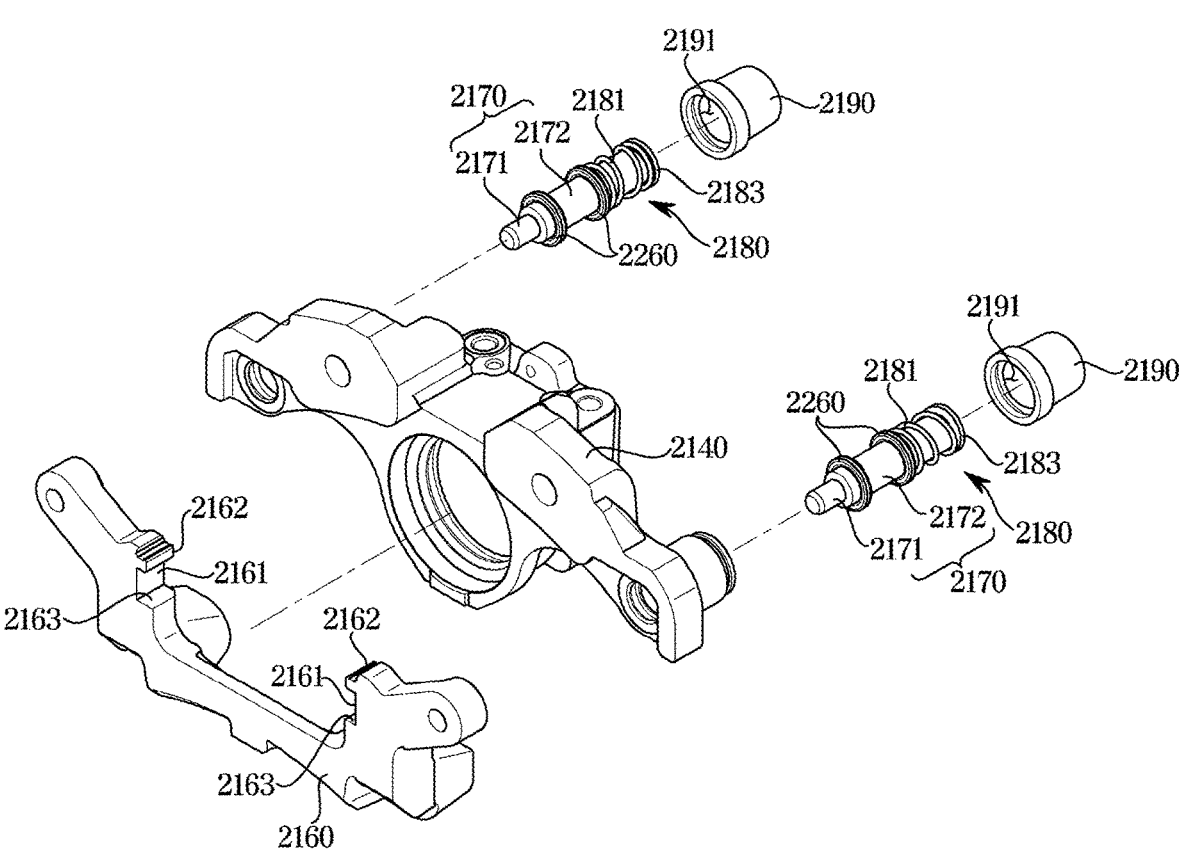

【Fig. 26】
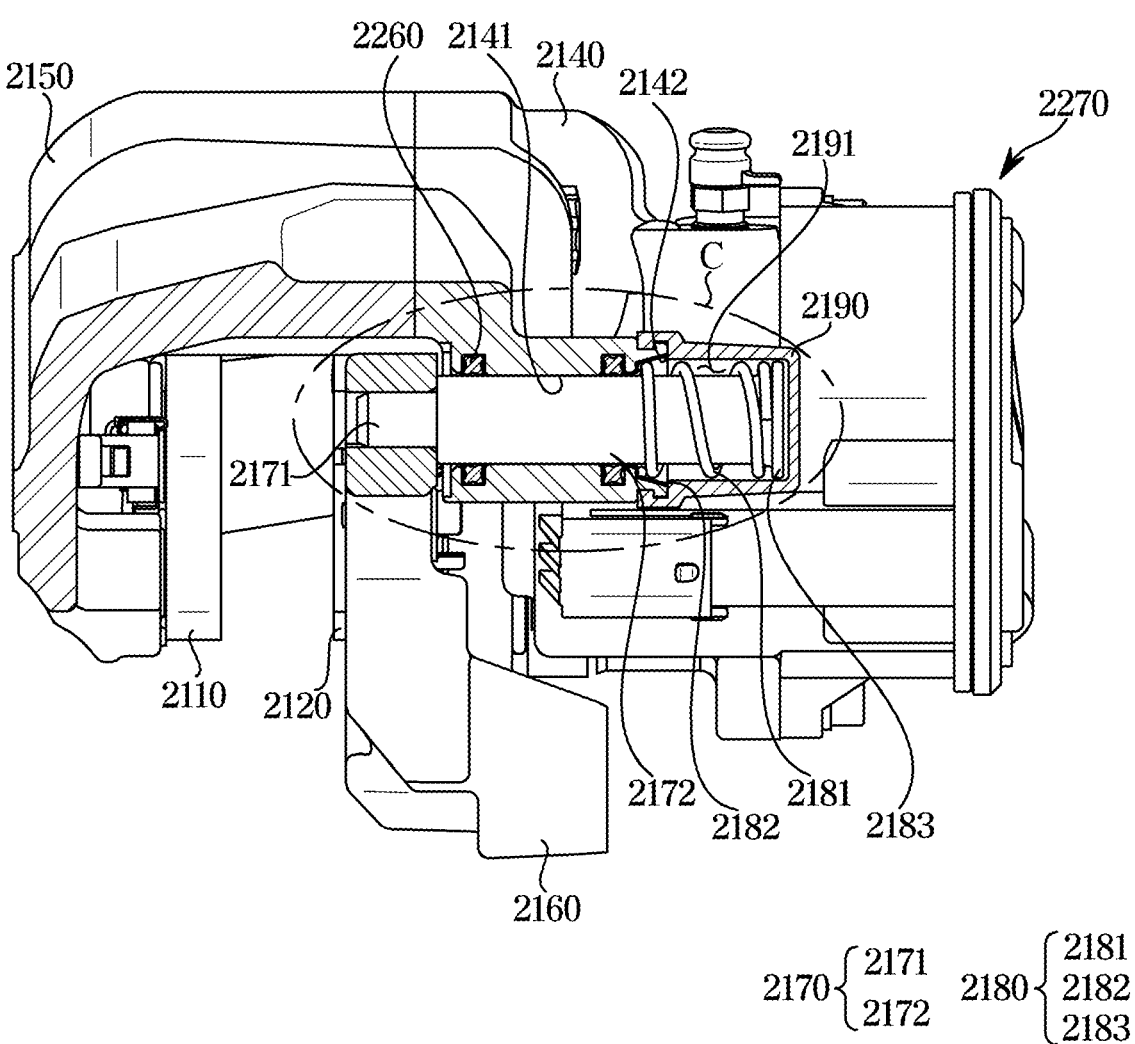

【Fig. 27】
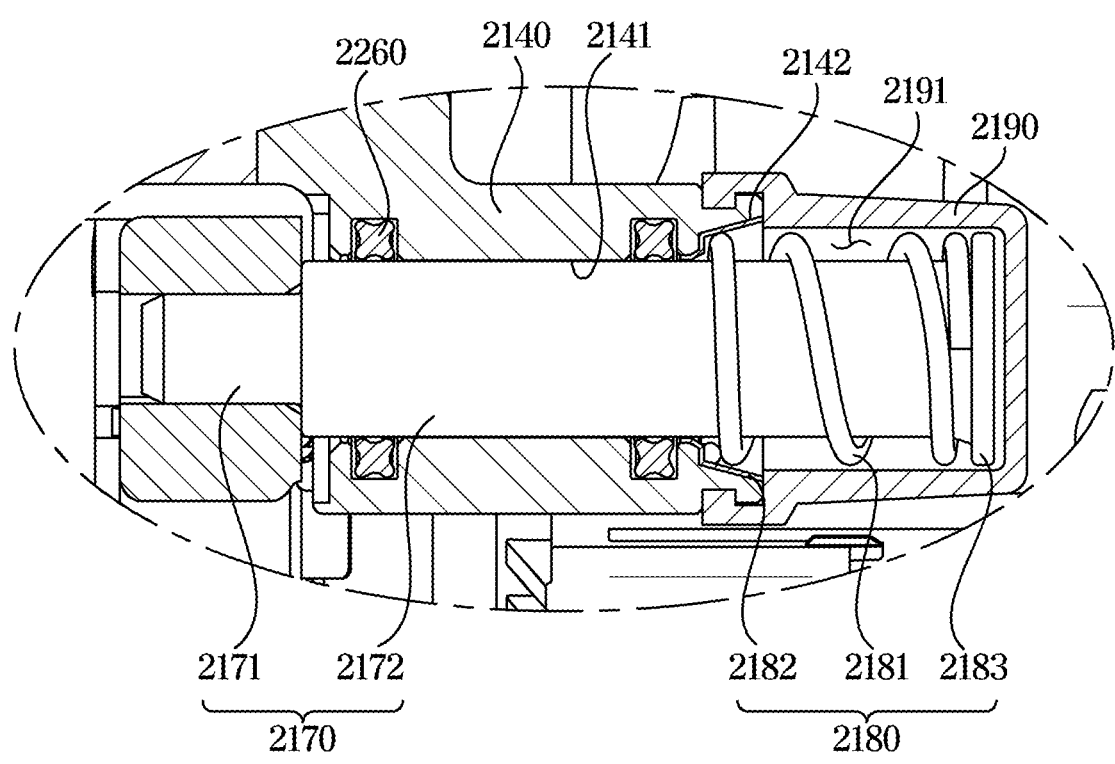

【Fig. 28】
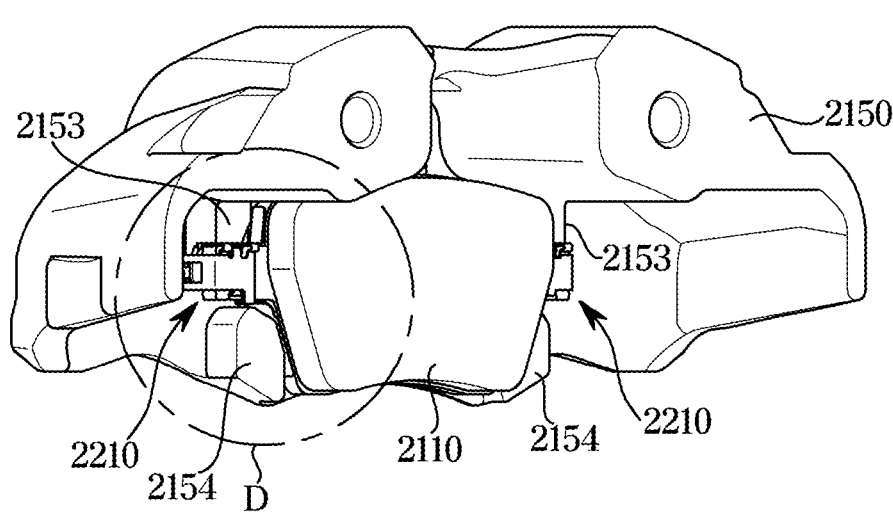

【Fig. 29】
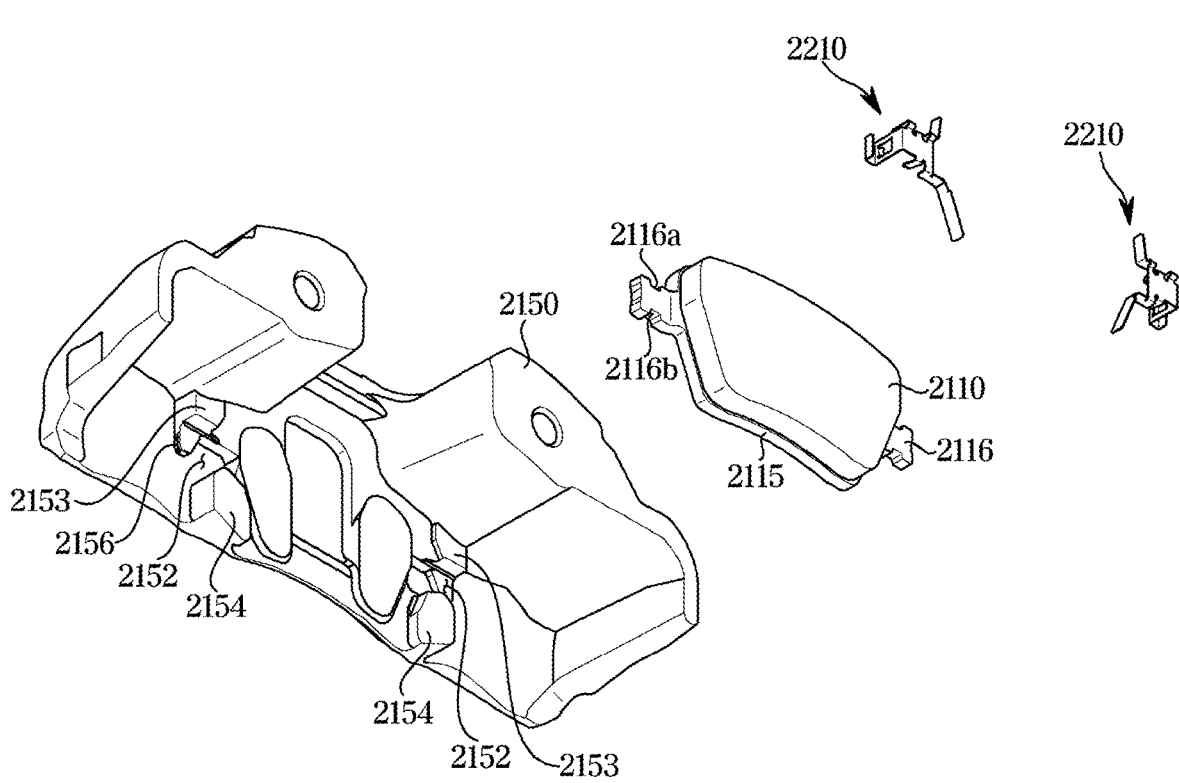

【Fig. 30】
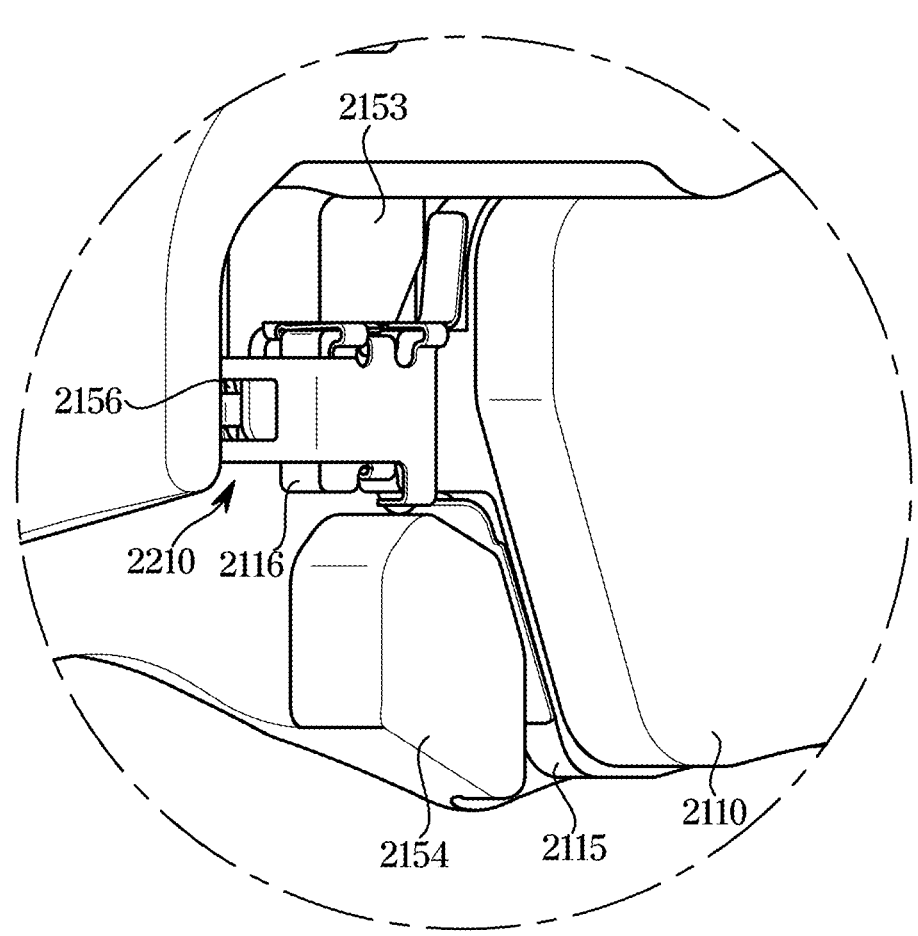

【Fig. 31】
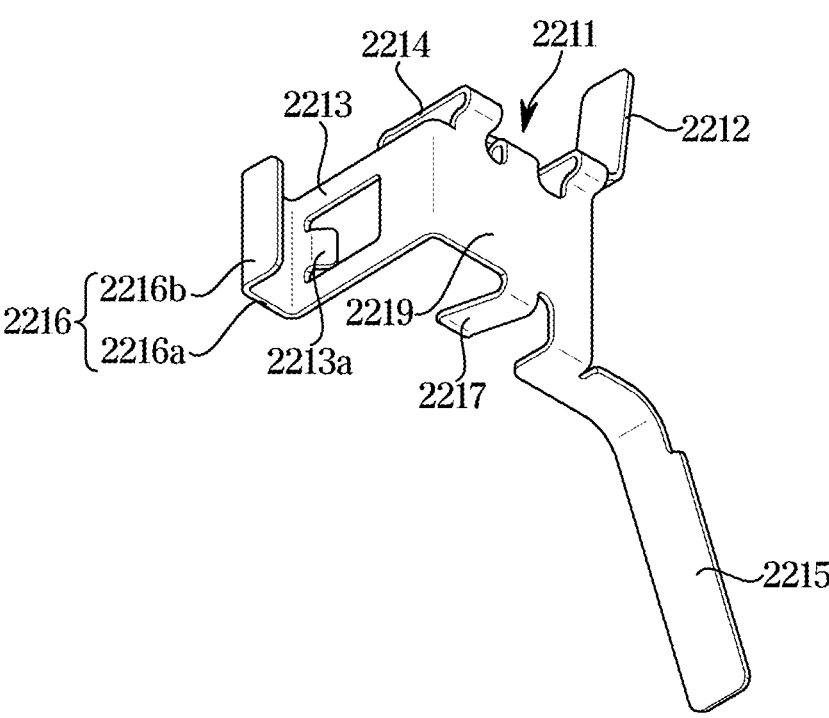

【Fig. 32】
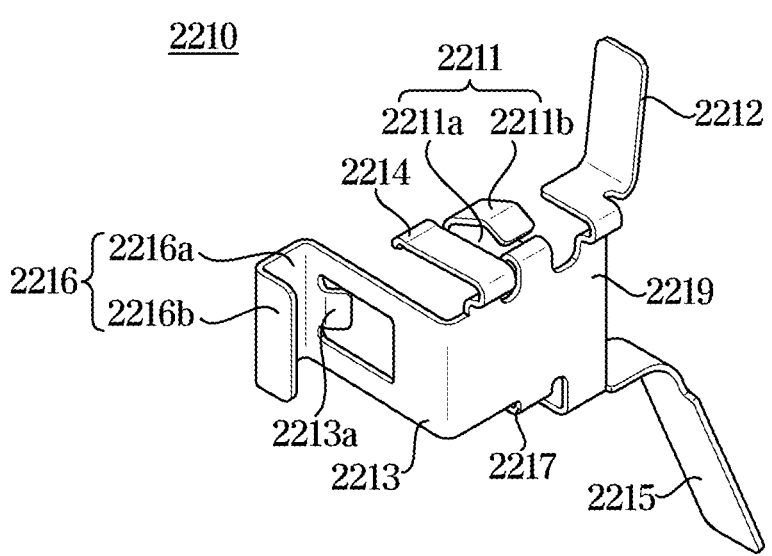

【Fig. 33】
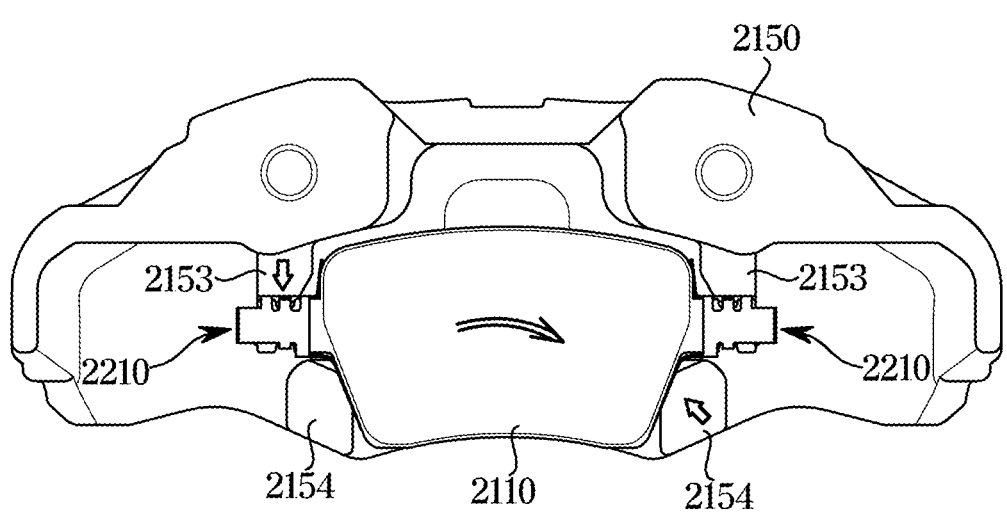

【Fig. 34】
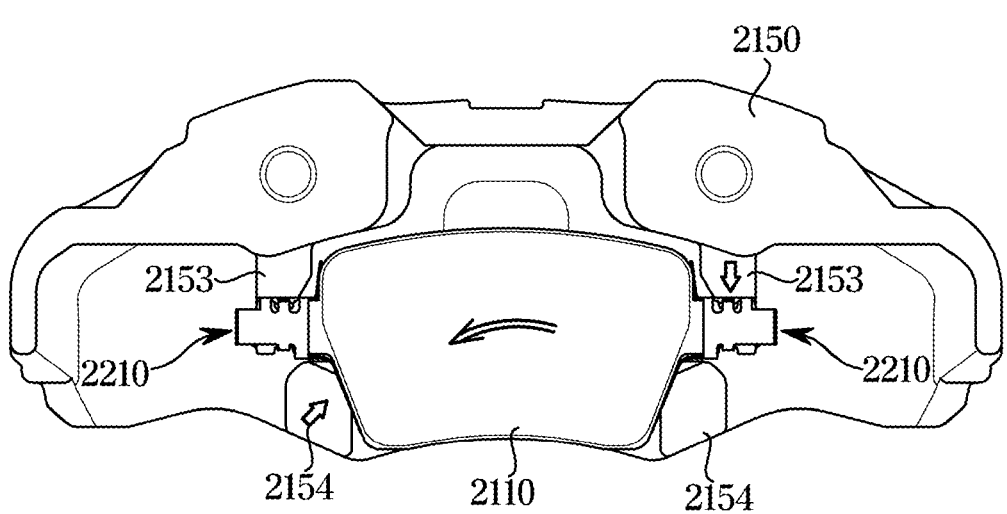

【Fig. 35】
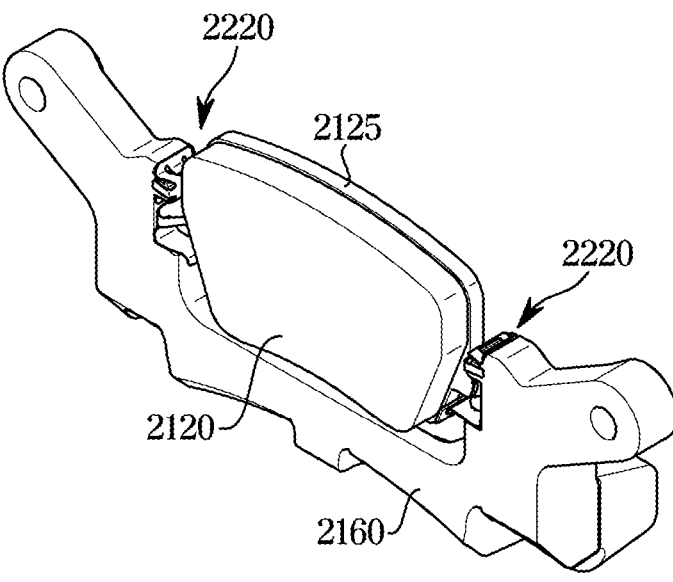

【Fig. 36】
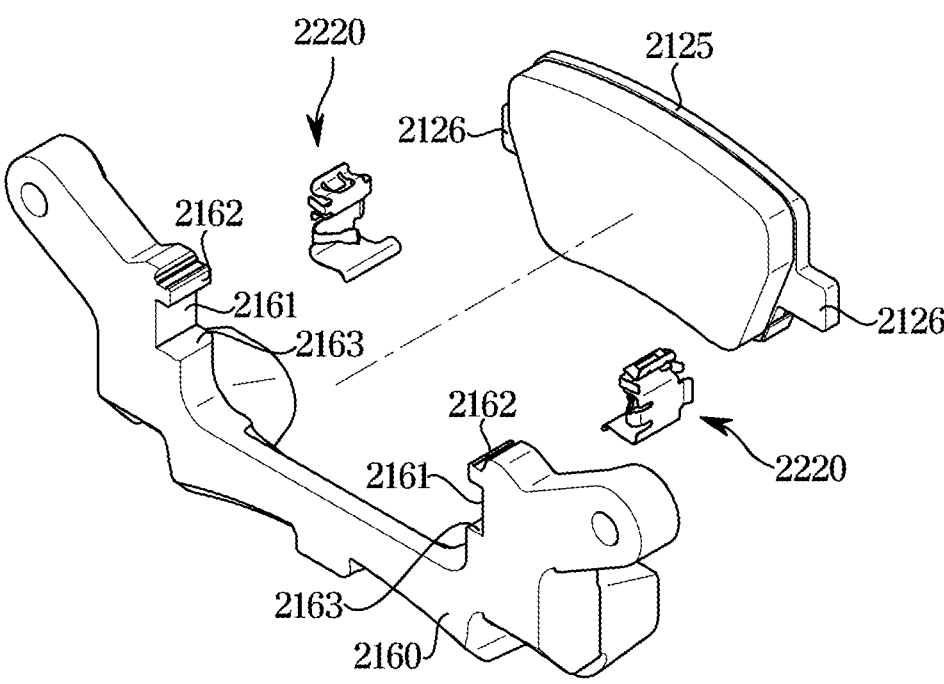

【Fig. 37】
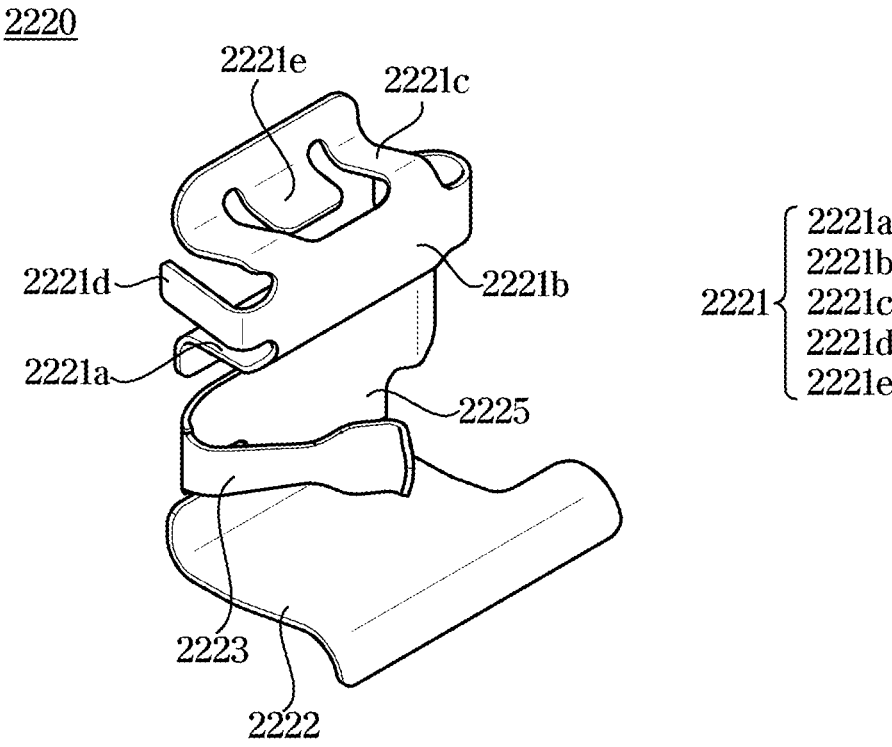

【Fig. 38】
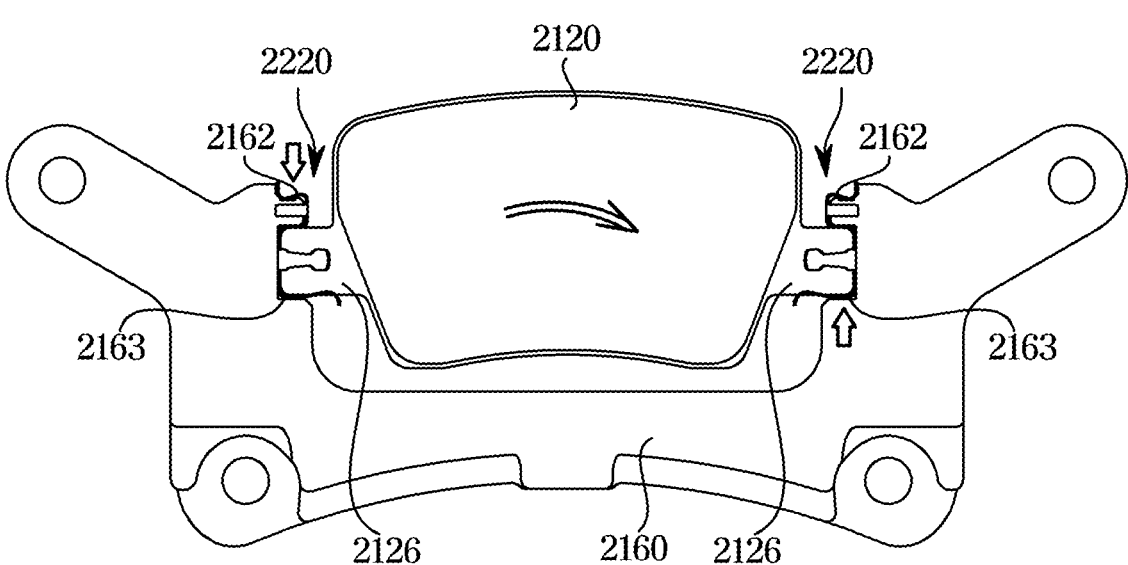

【Fig. 39】
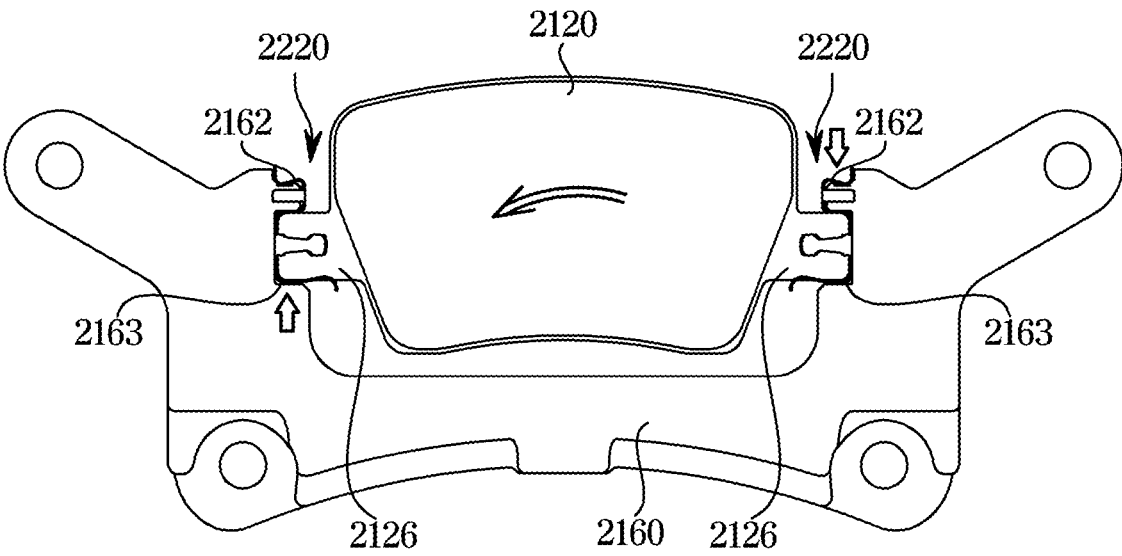

【Fig. 40】
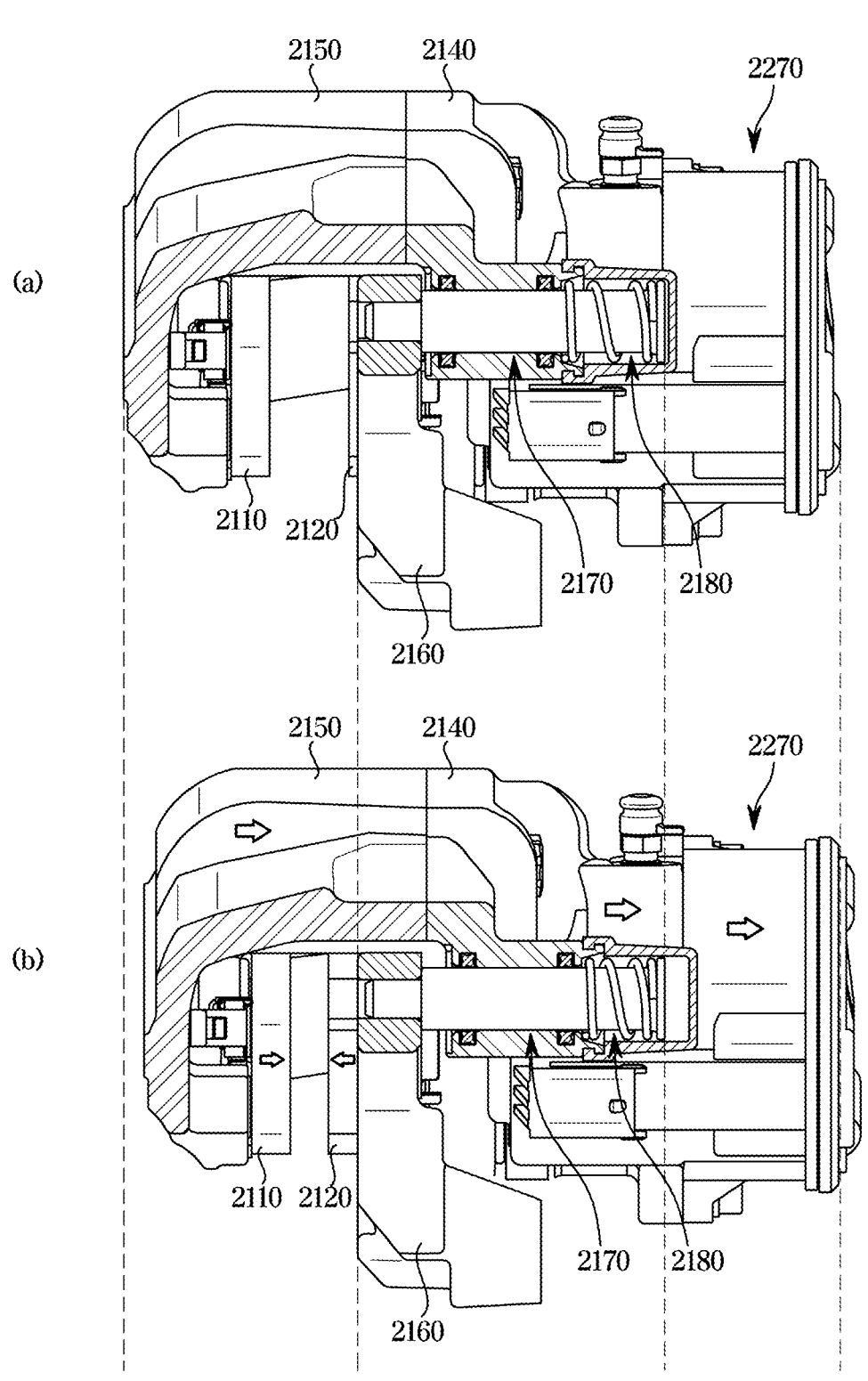

CALIPER BRAKE

CROSS-REFERENCE TO RELATED APPLICATION(S)

This application is based on and claims priority under 35 U.S.C. § 119 to Korean Patent Application No. 10-2021-0051144, filed on Apr. 20, 2021, No. 10-2021-0086640, filed on Jul. 1, 2021, and No. 10-2021-0106782, filed on Aug. 12, 2021 in the Korean Intellectual Property Office, the disclosure of which is incorporated herein by reference in its entirety.

TECHNICAL FIELD

The disclosure relates to a caliper brake, and more particularly, to a caliper brake that performs braking of a vehicle by using power from an electric motor, and has simplified part structures and appearance.

BACKGROUND

In general, a vehicle is equipped with a brake system for performing braking essentially, and various types of brake systems have been proposed for a safety of passengers and luggage.

For example, a caliper brake is a brake system that obtains a braking force by friction or clamping force between a brake disk and a pair of brake pads by contacting and pressing the pair of brake pads against both sides of the brake disk rotating together with a wheel of a vehicle. The caliper brake includes a caliper wrapped around the brake pads so that the brake pads may move forward and backward toward the brake disc. The caliper is provided with a cylinder and a piston, and as hydraulic pressure for braking is applied inside the cylinder, the piston advances and presses the brake pads against the brake disc.

Recently, to provide a braking force for parking of the vehicle by receiving a driver's intention I to brake as an electric signal and operating electric devices such as a motor based on the received electric signal, a structure in which an actuator including a motor and a reducer is applied to the caliper brake has been developed and commercialized.

On the other hand, nowadays, a monoblock type caliper has been developed and applied to high-performance vehicles or luxury vehicles. The monoblock type caliper has high rigidity and is strong against thermal deformation, as well as a beautiful appearance, which may improve marketability or competitiveness of products. The monoblock type caliper does not form a caliper by combining a plurality of components with each other like a conventional caliper, but is formed by integrally manufacturing a single component.

When an actuator for parking braking is to be applied to such a monoblock type caliper, components such as a parking piston and a parking caliper that are advanced and retreated by the actuator are required additionally manufactured and mounted, thereby increasing manufacturing cost and lowering product productivity. Furthermore, In addition, the monoblock type caliper is manufactured by precisely processing one component to form one block, so that the manufacturing cost increases and the manufacturing period becomes longer.

SUMMARY

An aspect of the disclosure is to provide a caliper brake capable of simplifying part structures and appearance.

Another aspect of the disclosure is to provide a caliper brake capable of lowering manufacturing cost and improving productivity by reducing the number of parts.

Another aspect of the disclosure is to provide a caliper brake capable of achieving a beautiful appearance in spite of applying an actuator having a motor.

Another aspect of the disclosure is to provide a caliper brake capable of stably braking a vehicle in various operating situations without installing additional parts.

Another aspect of the disclosure is to provide a caliper brake with a simple structure and easy maintenance.

Another aspect of the disclosure is to provide a caliper brake capable of reducing the size and volume of a product, thereby improving applicability of a vehicle, and promoting space utilization of the vehicle.

Another aspect of the disclosure is to provide a caliper brake capable of improving marketability and competitiveness of a vehicle.

Additional aspects of the disclosure will be set forth in part in the description which follows and, in part, will be obvious from the description, or may be learned by practice of the disclosure.

In accordance with an aspect of the disclosure, a caliper brake includes a brake disc rotating with a wheel of a vehicle; an inner brake pad and an outer brake pad respectively disposed on opposite sides of the brake disc; a pressing member configured to press the inner brake pad against the brake disc; a caliper housing in which the pressing member is movable forward and backward; a caliper bridge connected to the caliper housing and configured to press the outer brake pad against the brake disc by a reaction force in response to operation of the pressing member; a carrier fixed to a body of the vehicle; and at least one guide rod fixed to the carrier and guiding sliding movement of the caliper housing and the caliper bridge with respect to the carrier.

The caliper housing may include a guide hole that is formed through in the forward and backward direction of the pressing member, and the at least on guide rod extends along the forward and backward direction and provided to be inserted and passed through the guide hole.

The guide rod may include a core portion fixed to the carrier, and a bush portion facing the guide hole.

The caliper brake may further include a restoration device configured to elastically support the caliper housing and the caliper bridge in a direction to return to original positions with respect to the carrier, wherein the restoration device is provided on an outer surface of the guide rod.

The caliper bridge may be configured to surround the outer brake pad and cover a front surface of the caliper housing.

The caliper bridge may include a display, at least a part of the display is formed in a flat so that a logo or emblem may be applied on a front surface thereof.

The caliper brake may further include at least one outer pad spring configured to elastically support the outer brake pad on a rear surface of the caliper bridge, wherein the caliper bridge may further include an outer spring seat that is recessed from a surrounding area on the rear surface, and on which at least a part of the outer pad spring is settled and supported.

The outer pad spring may be configured to be mounted on a protrusion formed at a side end of an outer pad plate on which the outer brake pad is fixedly installed, and at least a part of the protrusion may be settled and accommodated in the outer spring seat.

The caliper bridge may include a first torque supporting protrusion protruding from one side of the outer spring seat to contact and support one side of the outer pad spring, and a second torque supporting protrusion protruding from the other side of the outer spring seat to contact and support the other side of the outer pad spring.

The outer pad spring may include a first elastic portion interposed between an upper end of the protrusion and a lower end of the first torque supporting protrusion to elastically support the protrusion on the first torque supporting protrusion, a second elastic portion interposed between a lower end of the protrusion and an upper end of the second torque supporting protrusion to elastically support the protrusion on the second torque supporting protrusion, and a third elastic portion that is cut and bent forwardly from a base and is in contact with and supported by a side end of the protrusion.

The outer pad spring may further include a base facing a rear surface of the protrusion, and the first elastic portion is continuously extended and bent from an upper end of the base, and the second elastic portion is continuously extended and bent from a lower end of the base.

The caliper bridge may further include an outer spring fastening groove recessed on an outer surface of the first torque supporting protrusion to support the outer pad spring.

The outer pad spring may further include a first elastic portion interposed between an upper end of the protrusion and a lower end of the first torque supporting protrusion to elastically support the protrusion, a second elastic portion provided to be in contact with a side surface of the outer pad plate to elastically support the outer pad plate, and a fastening portion inserted into the outer spring fastening groove.

The outer pad spring may further include a first protection portion interposed between the protrusion and the first torque supporting protrusion to prevent contact between the protrusion and the first torque supporting protrusion, and a second protection portion interposed between the outer pad plate and the second torque supporting protrusion to prevent contact between the outer pad plate and the second torque supporting protrusion.

The outer pad spring may further include a base disposed to face a rear surface of the protrusion, and the first elastic portion is formed to be extended and bent from an upper end of the base, and the second elastic portion is formed to be bent and extended from the upper end of the base toward an upper side of the protrusion on a side surface of the outer pad plate, wherein the first elastic portion may further include a base surface extending forward along the upper end of the protrusion from the upper end of the base, and an inclined surface bent and extended from the base surface toward the first torque supporting protrusion.

The outer pad spring may further include a base disposed to face a rear surface of the protrusion, and the fastening portion is formed to be bent and extended from a side end of the base forward, and includes a fastening tab bent and extended toward an inner side of the outer spring fastening groove.

The outer pad spring may further include a removal portion configured to separate the fastening tab from the outer spring fastening groove, and the removal portion includes a removal guide surface extending from the fastening portion in a direction opposite to an extending direction of the fastening tab.

The outer pad spring may further include a base disposed to face a rear surface of the protrusion, the first protection portion is formed to extend forward along the lower end of the first torque supporting protrusion from the upper end of the base, and is interposed between the upper end of the protrusion and the lower end of the first torque supporting protrusion.

The second protection portion may be formed to extend from the lower end of the base along a lower side of the protrusion on a side surface of the outer pad plate, and is interposed between the lower side of the protrusion on the side surface of the outer pad plate and an inner surface of the second torque supporting protrusion.

The guide rod may be provided with a pair thereof on both sides with respect to an axial direction of the pressing member.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a perspective view illustrating a caliper brake according to a first embodiment of the disclosure;

FIG. 2 is a plan view illustrating a caliper brake according to the first embodiment of the disclosure;

FIG. 3 is an exploded perspective view illustrating a caliper brake according to the first embodiment of the disclosure;

FIG. 4 is an exploded perspective view in another direction illustrating the caliper brake according to the first embodiment of the disclosure;

FIG. 5 is a front view illustrating a pressing member, a caliper housing, a carrier, and a guide rod according to the first embodiment of the disclosure;

FIG. 6 is an exploded perspective view illustrating the guide rod and a restoration device according to the first embodiment of the disclosure;

FIG. 7 is a cross-sectional view taken along the A-A' direction of FIG. 2, and a cross-sectional view illustrating the guide rod and the restoration device according to the first embodiment of the disclosure;

FIG. 8 is an enlarged view of part B of FIG. 7;

FIG. 9 is a cross-sectional view illustrating a guide rod and a restoration device according to a modified embodiment of the disclosure;

FIG. 10 is a perspective view illustrating a caliper bridge, an outer brake pad, and an outer pad spring according to the first embodiment of the disclosure;

FIG. 11 is an exploded perspective view illustrating the caliper bridge, the outer brake pad, and the outer pad spring according to the first embodiment of the disclosure;

FIG. 12 is a perspective view illustrating the outer pad spring according to the first embodiment of the disclosure;

FIG. 13 is a side view illustrating the outer pad spring according to the first embodiment of the disclosure;

FIG. 14 is a rear view illustrating the caliper bridge, the outer brake pad, and the outer pad spring according to the first embodiment of the disclosure, and illustrating a state in which a load applied in one direction is supported;

FIG. 15 is a rear view illustrating the caliper bridge, the outer brake pad, and the outer pad spring according to the first embodiment of the disclosure, and illustrating a state in which a load applied in another direction is supported;

FIG. 16 is a perspective view illustrating a carrier, an inner brake pad, and an inner pad spring according to the first embodiment of the disclosure;

FIG. 17 is an exploded perspective view illustrating the carrier, the inner brake pad, and the inner pad spring according to the first embodiment of the disclosure;

FIG. 18 is a perspective view illustrating the inner pad spring according to the first embodiment of the disclosure;

FIG. 19 is a front view illustrating the carrier, the inner brake pad, and the inner pad spring according to the first embodiment of the disclosure, and illustrating a state in which a load applied in one direction is supported;

FIG. 20 is a front view illustrating the carrier, the inner brake pad, and the inner pad spring according to the first embodiment of the disclosure, and illustrating a state in which a load applied in another direction is supported;

FIG. 21 is a lateral cross-sectional view illustrating an operating state of the caliper brake according to the first embodiment of the disclosure;

FIG. 22 is an exploded perspective view illustrating the caliper brake according to a second embodiment of the disclosure;

FIG. 23 is an exploded perspective view illustrating the caliper brake according to the second embodiment of the disclosure;

FIG. 24 is a front view illustrating a pressing member, a caliper housing, a carrier, and a guide rod according to the second embodiment of the disclosure;

FIG. 25 is an exploded perspective view illustrating a guide rod and a restoration device according to the second embodiment of the disclosure;

FIG. 26 is a cross-sectional view illustrating the guide rod and the restoration device according to the second embodiment of the disclosure;

FIG. 27 is an enlarged view of part C of FIG. 26;

FIG. 28 is a perspective view illustrating a caliper bridge, an outer brake pad, and an outer pad spring according to the second embodiment of the disclosure;

FIG. 29 is an exploded perspective view illustrating the caliper bridge, the outer brake pad, and the outer pad spring according to the second embodiment of the disclosure;

FIG. 30 is an enlarged view of part D of FIG. 9;

FIG. 31 is a perspective view illustrating the outer pad spring according to the second embodiment of the disclosure;

FIG. 32 is a perspective view from another direction illustrating the outer pad spring according to the second embodiment of the disclosure;

FIG. 33 is a rear view illustrating the caliper bridge, the outer brake pad, and the outer pad spring according to the second embodiment of the disclosure, and illustrating a state in which a load applied in one direction is supported;

FIG. 34 is a rear view illustrating the caliper bridge, the outer brake pad, and the outer pad spring according to the second embodiment of the disclosure, and illustrating a state in which a load applied in another direction is supported;

FIG. 35 is a perspective view illustrating a carrier, an inner brake pad, and an inner pad spring according to the second embodiment of the disclosure;

FIG. 36 is an exploded perspective view illustrating the carrier, the inner brake pad, and the inner pad spring according to the second embodiment of the disclosure;

FIG. 37 is a perspective view illustrating the inner pad spring according to the second embodiment of the disclosure;

FIG. 38 is a front view illustrating the carrier, the inner brake pad, and the inner pad spring according to the second embodiment of the disclosure, and illustrating a state in which a load applied in one direction is supported;

FIG. 39 is a front view illustrating the carrier, the inner brake pad, and the inner pad spring according to the second embodiment of the disclosure, and illustrating a state in which a load applied in another direction is supported; and FIG. 40 is a lateral cross-sectional view illustrating an operating state of the caliper brake according to the second embodiment of the disclosure.

DETAILED DESCRIPTION

Hereinafter, the embodiments of the disclosure will be described in detail with reference to accompanying drawings. It should be understood that the terms used in the specification and the appended claims should not be construed as limited to general and dictionary meanings, but interpreted based on the meanings and concepts corresponding to technical aspects of the disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

FIGS. 1 and 2 are perspective view and top plan view illustrating a caliper brake 1 according to a first embodiment of the disclosure, and FIGS. 3 and 4 are exploded perspective views in another directions illustrating the caliper brake 1 according to the first embodiment of the disclosure.

Referring to FIGS. 1 to 4, the caliper brake 1 according to the first embodiment of the disclosure may include a brake disc (not shown) that rotates together with a wheel (not shown) of a vehicle, a pair of brake pads 1110 and 1120 that dispose on opposite sides of the brake disc, a carrier 1160 fixed to a vehicle body and installed with the inner brake pad 1120, a caliper housing 1140 slidably installed on the carrier 1160, a pressing member 1130 installed on the caliper housing 1140 to be movably forward and backward, a caliper bridge 1150 that is provided with the outer brake pad 1110 and is connected to the caliper housing 1140 to be slidably movable together with the caliper housing 1140, a guide rod 1170 that is fixed to the carrier 1160 and is connected to the caliper housing 1140 to guide a sliding movement of the caliper housing 1140 and the caliper bridge 1150 with respect to the carrier 1160, a restoration device 1180 that returns the vehicle to its original position which is a pre-braking state or a braking release state of the vehicle, and an actuator 1270 that generates and provides a driving force for operating the pressing member 1130.

The brake disk (not shown) is provided to rotate together with the wheel of the vehicle, and the inner brake pad 1120 and the outer brake pad 1110 are respectively disposed on opposite sides of the brake disk. The inner and outer brake pads 1120 and 1110 are fixedly installed on inner and outer pad plates 1125 and 1115, respectively, and the brake pads 1110 and 1120 are respectively attached to the inner surface (the surface facing the brake disk) of each of the pad plates 1115 and 1125. The inner pad plate 1125 is disposed so that the outer surface thereof is in contact with the pressing member 1130 to be described later, and the outer pad plate 1115 is installed on a rear surface of the caliper bridge 1150 to be described later together with the outer brake pad 1110. Accordingly, when the vehicle is braked, the pressing member 1130 advances and presses the inner pad plate 1125 and the inner brake pad 1120 toward the brake disc side to closely contact them, and as a reaction force therefor, the caliper housing 1140 and the caliper bridge 1150 connected thereto slide in a direction opposite to the forward direction of the pressing member 1130 with respect to the carrier 1160 fixedly installed on the vehicle body. As a result, the outer pad plate 1115 and the outer brake pad 1110 installed on the caliper bridge 1150 may be pressed toward and closely in contact with the brake disc.

The inner pad plate 1125 and the outer pad plate 1115 may have protrusions 1116 and 1126 formed at opposite ends thereof, respectively, and an inner pad spring 1220 and an outer pad spring 1210, which will be described later, may be mounted and supported by each protrusion 1116. Each of the protrusions 1116 and 1126 may be provided with a plurality of grooves that are recessed so that a part of a pad spring to be described later is stably seated, and a detailed description thereof will be provided later.

The pressing member 1130 may be formed of a piston, and may be provided so as to move forward and backward inside a cylinder provided in the caliper housing 1140. The pressing member 1130 may brake the vehicle by moving forward by a hydraulic pressure of a pressurized medium such as a brake oil, etc. and may release braking of the vehicle by retreating. Furthermore, the pressing member 1130 may be operated electromechanically by the actuator 1270 to be described later to perform braking or parking of the vehicle by moving forward, and release the braking or parking state of the vehicle by retreating.

The caliper housing 1140 includes a cylinder in which the piston is arranged to be movably forward and backward, and a pair of guide holes 1141 passing through both sides of the cylinder in a direction parallel to the forward and backward direction of the pressing member 1130. The caliper bridge 1150 may be connected and mounted to the caliper housing 1140 by a fastening member 1250 to cover a front surface of the caliper housing 1140. Each of the guide rods 1170 to be described later may be inserted and passed through each of the pair of guide holes 1141, and because the guide rods 1170 are fixed to the carrier 1160, the caliper housing 1140 and the caliper bridge 1150 connected thereto may slide along the forward and backward direction.

On the other hand, the front surface (front side) described in the first embodiment of the disclosure refers to an outer surface (outside) that may be visually confirmed by a driver or a user from an outside of the vehicle, and refers to a lower surface (bottom side) with reference to FIG. 2. Conversely, the rear surface (back side) described in the first embodiment of the disclosure refers to the opposite side of the front surface (front side), and refers to an upper surface (top side) with reference to FIG. 2. Furthermore, advancing/retreating direction or axial direction described in the first embodiment of the disclosure refers to a direction in which the pressing member 1130 advances and retreats with respect to the pressing member 1130 or a direction parallel to a longitudinal axis of the pressing member 1130.

The caliper bridge 1150 is connected and mounted to the caliper housing 1140 by the fastening member 1250, and the caliper bridge 1150 and the caliper housing 1140 may slide together with respect to the carrier 1160. The caliper bridge 1150 may be provided with the outer pad plate 1115 and the outer brake pad 1110 which are installed on the rear surface thereof, and a display 1151 to which a logo or emblem of a product or a vehicle may be applied may be provided on the front surface thereof. The display 1151 may be provided by forming at least a part thereof on the front surface of the caliper bridge 1150 to be flat.

Because the caliper bridge 1150 is connected and mounted to the caliper housing 1140, when the caliper housing 1140 slides with respect to the carrier 1160 by the guide rod 1170 to be described later, the caliper bridge 1150 also may slide together. Accordingly, when the vehicle is braked, the caliper housing 1140 and the caliper bridge 1150 slide together in the opposite direction to the moving direction of the pressing member 1130 due to the reaction force caused by the advancing of the pressing member 1130, so that the outer brake pad 1110 installed on the caliper bridge 1150 may be pressed toward and closely in contact with the brake disc. Conversely, when braking of the vehicle is released, the caliper housing 1140 is returned to its original position by the restoration device 1180 to be described later, and the caliper bridge 1150 connected to the caliper housing 1140 also moves to its original position, so that the outer brake pad 1110 installed on the caliper bridge 1150 may be spaced apart from the brake disc.

Furthermore, the caliper bridge 1150 may be provided to cover the front surface of the caliper housing 1140, thereby forming an exterior of the product. The caliper bridge 1150 is provided not only to cover various components such as the brake pads 1110 and 1120 and pad plates 1115 and 1125 disposed thereinside, but also to cover the entire front surface of the caliper housing 1140. Accordingly, the caliper bridge 1150 may make appearance of the product visible from wheel or the outside of the vehicle beautiful. In particular, nowadays, appearance of the wheels and calipers seen from the outside, which are applied to high-performance or luxury vehicles, become a very important purchasing decision factor for consumers. Accordingly, the caliper bridge 1150 provided to cover the front surface of the caliper housing 1140 while enclosing various components and provided with the display 1151 capable of displaying a product or a brand of a vehicle on the front surface thereof may improve marketability and competitiveness of products and the applied vehicles.

A detailed description of the outer brake pad 1110, the outer pad plate 1115, and the outer pad spring 1210 which are mounted on the rear surface of the caliper bridge 1150 will be described later with reference to FIGS. 10 to 15.

The carrier 1160 may be fixedly installed to a supportable structure such as the vehicle body by a bolt 1169 or the like. On opposite sides of the carrier 1160, the guide rods 1170 to be described later may be fixedly installed, and to this end, on the opposite sides of the carrier 1160, coupling portions to which the guide rods 1170 are screwed may be penetrated in the forward and backward direction thereof, or may be formed to be recessed on the rear surface of the carrier 1160. To this end, a thread may be formed on an inner circumferential surface of the coupling portion. Furthermore, in the carrier 1160, the inner pad plate 1125 and the inner brake pad 1120 may be installed on a central portion adjacent to the pressing member 1130, and the inner pad spring 1220 may be mounted between the protrusion 1116 of the inner pad plate 1125 and the carrier 1160. A detailed description of the inner brake pad 1120, the inner pad plate 1125, and the inner pad spring 1220 which are mounted on the central portion of the carrier 1160 will be described later with reference to FIGS. 16 to 19.

The guide rods 1170 are fixedly installed on the opposite sides of the carrier 1160, and are provided to guide the sliding movement of the caliper housing 1140 and the caliper bridge 1150 with respect to the carrier 1160. Furthermore, the restoration device 1180 is disposed on an outer side of the guide rod 1170 to return the caliper housing 1140 and the caliper bridge 1150 to their original positions that are a pre-braking state or braking release state of the vehicle.

FIG. 5 is a front view illustrating the pressing member 1130, the caliper housing 1140, the carrier 1160, and the guide rod 1170 according to the first embodiment of the disclosure, FIG. 6 is an exploded perspective view illustrating the guide rod 1170 and the restoration device 1180 according to the first embodiment of the disclosure. Furthermore, FIG. 7 is a cross-sectional view taken along the A-A' direction of FIG. 2, and FIG. 8 is an enlarged view of a part B of FIG. 7.

Referring to FIGS. 3 to 8, the guide rod 1170 may be provided in a cylindrical shape extending along the forward and backward direction. One side of the guide rod 1170 may be fixedly installed by being inserted and fastened to the coupling portion of the carrier 1160, and the other side of the guide rod 1170 may be arranged to insert and pass through the guide hole 1141 formed through the caliper housing 1140 in the forward and backward direction. Because the guide rod 1170 is fixed to the carrier 1160, the guide rod 1170 maintains a position together with the carrier 1160, and when the vehicle is braked or released, the caliper housing 1140 and the caliper bridge 1150 may be guided by moving forward and backward along the guide rod 1170.

As shown in FIG. 5, the guide rod 1170 may be provided on both sides of the pressing member 1130 with respect to an axial direction of the pressing member 1130. When the brake disc and the brake pad are in close contact with each other for braking of the vehicle, a load may be applied to various components such as the caliper housing 1140 and the caliper bridge 1150 by the wheel and the brake disc that are rotating, which may cause deformation of various components including the caliper housing 1140 and the caliper bridge 1150. Accordingly, since the guide rod 1170 and the guide hole 1141 are provided on both sides of the pressing member 1130, respectively, the forward and backward movement of the caliper housing 1140 and the caliper bridge 1150 may be stably induced and guided despite the load applied during braking. Although it is shown in the drawings that the pair of guide rods 1170 are provided symmetrically on both sides of the pressing member 1130, it is not limited to the corresponding position and number, and the number and position may vary depending on the weight of the vehicle or the capacity of the brake disc.

At least one sealing member 1260 for preventing an inflow of foreign substances may be interposed between an outer circumferential surface of the guide rod 1170 and an inner circumferential surface of the guide hole 1141, and the sealing member 1260 may be provided to be seated in a receiving groove recessed on the inner circumferential surface of the guide hole 1141. However, unlike those shown in FIGS. 7 and 8, it should be understood that the receiving groove may be formed to be recessed on the outer circumferential surface of the guide rod 1170 and the sealing member 1260 is inserted and seated thereon.

The guide rod 1170 may include a core portion 1171 inserting and fastening to the coupling portion of the carrier 1160, and a bush portion 1172 inserting and passing through the guide hole 1141 to face the inner circumferential surface of the guide hole 1141. The core portion 1171 may be made of a material having high rigidity so that the guide rod 1170 may be firmly fixed and supported on the carrier 1160, and may be coupled to the carrier 1160 by screwing. To this end, a thread may be formed on an outer circumferential surface of a front end of the core portion 1171. However, an embodiment of the disclosure is not limited thereto, and it should be understood that the core portion 1171 also may be firmly coupled to the carrier 1160 by press-fitting or welding. Furthermore, since a number of contact and friction occur between the outer circumferential surface of the bush portion 1172 and the inner circumferential surface of the guide hole 1141 due to repetition of vehicle braking, the bush portion 1172 may be made of a material resistant to wear. In other words, the core portion 1171 and the bush portion 1172 may be manufactured from two components having different materials and then assembled with each other. However, an embodiment of the disclosure is not limited thereto, and it should be understood that the guide rod 1170 may be integrally manufactured and provided with a single material that has stable rigidity but is resistant to abrasion.

The restoration device 1180 is provided to elastically support the caliper housing 1140 and the caliper bridge 1150 in a direction to return them to their original positions.

Referring to FIGS. 6 to 8, the restoration device 1180 may be provided on the outer surface of the guide rod 1170. The restoration device 1180 may include a return spring 1181 disposed along the outer circumferential surface of the guide rod 1170, and first and second supporters provided on the guide rod 1170 to support one end and the other end of the return spring 1181, respectively.

The return spring 1181 may be disposed on the outer circumferential surface of the rear side of the guide rod 1170. As an example, the return spring 1181 may be provided as a coil spring to surround the outer circumferential surface of the guide rod 1170 as shown in FIGS. 6 to 8, but is not limited to the corresponding structure. The return spring may be made of various elastic materials as long as it may be disposed on the outer circumferential surface of the guide rod 1170.

The one end of the return spring 1181 may be supported by the first supporter. More specifically, a front end of the return spring 1181 may be supported by the first supporter, and the first supporter may be provided as a retainer 1182 mounted on the outer circumferential surface of the guide rod 1170. The retainer 1182 is provided in a cylindrical shape with an empty interior, and may have a diameter larger than the outer diameters of the guide rod 1170 and the return spring 1181. A front end of the retainer 1182 is reduced radially inward to be in close contact with and fixed to the outer circumferential surface of the guide rod 1170, and the one end of the return spring 1181 may be inserted or supported. Furthermore, a rear end of the retainer 1182 extends radially outward, so that a guide cap 1190 to be described later may be fastened thereto.

The other end of the return spring 1181 may be supported by the second supporter. More specifically, a rear end of the return spring 1181 may be supported by the second supporter, and the second supporter may be provided as a clip 1185 mounted on the outer circumferential surface of the guide rod 1170. The clip 1185 may be provided in a ring shape so that the guide rod 1170 is inserted therein, and may be fastened to the rear end on the outer circumferential surface of the guide rod 1170. A groove may be formed in the outer circumferential surface of the guide rod 1170 into which a part of an inner circumferential side of the clip 1185 is inserted for stable fastening of the clip 1185. The clip 1185 is installed in a form extending outward from the outer circumferential surface of the guide rod 1170 in a radial direction, so that the other end of the return spring 1181 may be in contact with and supported on the front side of the clip 1185.

A rear opening of the guide hole 1141 may be sealed by the guide cap 1190. The guide cap 1190 has an accommodating space 1191 in which at least a part of the rear end of the guide rod 1170 and the restoration device 1180 is accommodated therein, and a front end thereof may be mounted by being fastened to the retainer 1182. To this end, the front end of the guide cap 1190 may include a shoulder protruding inwardly to be stably coupled to the rear end of the retainer 1182. Covering the rear opening of the guide hole 1141 by the guide cap 1190 may prevent the inflow of foreign substances, and also prevent interference with external components when the guide rod 1170 and the restoration device 1180 are operated, thereby ensuring stable operation.

FIG. 9 is a cross-sectional view illustrating the guide rod 1170 and the restoration device 1180 according to a modified embodiment of the disclosure.

Referring to FIG. 9, the guide rod 1170 may include the core portion 1171 inserted and fastened to the fastened portion of the carrier 1160, and the bush portion 1172 that is inserted and passed through the guide hole 1141 to face the inner circumferential surface of the guide hole 1141. The core portion 1171 may be formed in a cylindrical shape extending in the forward and backward direction, and the core portion 1171 is made of a material having high rigidity such that the guide rod 1170 may be firmly fixed and supported on the carrier 1160 to be coupled to the carrier 1160 by screwing. To this end, a thread may be formed on the outer circumferential surface of the front end of the core portion 1171. However, an embodiment of the disclosure is not limited thereto, and it should be understood that the core portion 1171 also may be firmly coupled to the carrier 1160 by press-fitting or welding. Furthermore, the bush portion 1172 may be formed in a hollow cylindrical shape and provided on the outer circumferential surface of the core portion 1171, and since a number of contact and friction occur between the outer circumferential surface of the bush portion 1172 and the inner circumferential surface of the guide hole 1141 due to repetition of vehicle braking, the bush portion 1172 may be made of a material resistant to wear. In other words, the core portion 1171 and the bush portion 1172 may be manufactured from two components having different materials and then assembled with each other.

The restoration device 1180 is provided to elastically support the caliper housing 1140 and the caliper bridge 1150 in the direction to return them to their original positions. Referring to FIG. 9, the restoration device 1180 may be provided on the outer surface of the guide rod 1170, and the restoration device 1180 may include the return spring 1181 disposed along the outer circumferential surface of the guide rod 1170 and the first and second supporters supporting one end and the other end of the return spring 1181, respectively.

The One end of the return spring 1181 may be supported by the first supporter. More specifically, the front end of the return spring 1181 may be supported by the first supporter, and the first supporter may be provided as a support groove 1283 recessed on the rear side on the inner circumferential surface of the guide hole 1141, and the front end of the return spring 1181 may be supported by being inserted into the support groove 1283.

The other end of the return spring 1181 may be supported by the second supporter. More specifically, the rear end of the return spring 1181 may be supported by the second supporter, and the second supporter may be provided as a supporting protrusion 1173 extending outwardly along the radial direction at the rear end on the outer circumferential surface of the guide rod 1170. The supporting protrusion 1173 may be provided integrally with the bush portion 1172, and the bush portion 1172 is formed to extend outwardly from the outer circumferential surface of the bush portion 1172 such that the other end of the return spring 1181 may be in contact with and supported on the front side of the supporting protrusion 1173.

The rear opening of the guide hole 1141 may be sealed by a guide cap 1290. The guide cap 1290 has an accommodating space 1291 in which at least a part of the rear end of the guide rod 1170 and the restoration device 1180 is accommodated therein, and surrounding areas of the guide hole 1141 may be mounted by being inserted and fastened to a front end of the guide cap 1290. The guide cap 1290 may be mounted by being press-fitted onto the caliper housing 1140 of the surrounding areas of the guide hole 1141, and may further include a fastening means for more stable coupling. By covering the rear opening of the guide hole 1141 by the guide cap 1290, the inflow of foreign substances may be prevented, and interference with external components may be prevented when the guide rod 1170 and the restoration device 1180 are operated, thereby ensuring the stable operation.

Hereinafter, a structure in which the outer brake pad 1110 is mounted to the caliper bridge 1150 by the outer pad spring 1210 will be described.

FIGS. 10 and 11 are perspective and exploded perspective views respectively illustrating the caliper bridge 1150, the outer brake pad 1110, and the outer pad spring 1210 according to the first embodiment of the disclosure. In addition, FIGS. 12 and 13 are perspective and side views illustrating the outer pad spring 1210 according to the first embodiment of the disclosure, and FIGS. 14 and 15 are rear views illustrating the caliper bridge 1150, the outer brake pad 1110, and the outer pad spring 1210 according to the first embodiment of the disclosure, illustrating an operating state of supporting a load by a first torque supporting protrusion 1153 and a second torque supporting protrusion 1154.

Referring to FIGS. 10 to 15, the outer pad spring 1210 is provided to elastically support the outer brake pad 1110 and the outer pad plate 1115 on the rear surface of the caliper bridge 1150. The outer pad spring 1210 is seated and supported on the outer spring seat 1152 formed on the rear surface of the caliper bridge 1150 in a state in which the outer pad spring 1210 is mounted on the protrusion 1116 formed at a side end of the outer pad plate 1115, thereby mounting and installing the outer brake pad 1110 on the caliper bridge 1150.

The outer spring seat 1152 is formed to be recessed from a surrounding area on the rear surface of the caliper bridge 1150 such that at least a part of the protrusion 1116 and the outer pad spring 1210 may be inserted and supported. The first torque supporting protrusion 1153 may be protruded from the upper side of the outer spring seat 1152, and the second torque supporting protrusion 1154 may be protruded from the lower side of the outer spring seat 1152.

The outer spring seat 1152 is formed on the rear surface of the caliper bridge 1150 and is not formed through or perforated, so that the outer spring seat 1152 may not be exposed on the front surface of the caliper bridge 1150 forming the exterior of the caliper brake 1. Furthermore, when the brake disc and the brake pads are in close contact with each other by the first torque supporting protrusion 1153 and the second torque supporting protrusion 1154 respectively protruding rearward on the upper and lower sides of the outer spring seat 1152, the outer spring seat 1152 may stably support the outer pad plate 1115 and the outer brake pad 1110 despite the load applied by wheel and the brake disc which are rotating. A detailed description thereof will be described later with reference to FIGS. 14 and 15.

The pair of outer pad springs 1210 may be provided on opposite ends of the outer pad plate 1115. Referring to FIGS. 12 and 13, the outer pad spring 1210 may include a base 1215, a first elastic portion 1121 that is provided on an upper side of the base 1215 and interposed between an upper end of the protrusion 1116 and an lower end of the first torque supporting protrusion 1153 to elastically support the protrusion 1116 on the first torque supporting protrusion 1153, a second elastic portion 1212 that is provided on a lower side of the base 1215 and interposed between an lower end of the protrusion 1116 and an lower end of the second torque supporting protrusion 1154 to elastically support the protrusion 1116 on the second torque supporting protrusion 1154, and a third elastic portion 1213 that is provided on a side of the base 1215 and is in contact with and supported by the side end of the protrusion 1116.

The base 1215 forms a main body and is provided to face or contact the rear surface of the protrusion 1116 of the outer pad plate 1115. The base 1215 may be provided in a plate shape, and the first elastic portion 1211, the second elastic portion 1212, and the third elastic portion 1213 may be provided at the top, bottom, and side ends of the base, respectively by continuously cutting and bending. In other words, the outer pad spring 1210 is provided integrally as a single body, and may be manufactured by cutting and bending the first to third elastic portions 1311 to 1213 from the base 1215, thereby simplifying structure and manufacturing process thereof.

The first elastic portion 1211 may be interposed between the upper end of the protrusion 1116 and the lower end of the first torque supporting protrusion 1153 to elastically support the protrusion 1116 on the first torque supporting protrusion 1153. The first elastic portion 1211 may be formed by continuously extending and bending from the upper end of the base 1215 as described above.

More specifically, the first elastic portion 1211 may include a first base surface 1211*a* extending forward along the upper end of the protrusion 1116 from the upper end of the base 1215, and a first inclined surface 1211*b* that is bent and extending toward the first torque supporting protrusion 1153 from the first base surface 1211*a*. The first base surface 1211*a* may extend along the upper end of the protrusion 1116, and may be partially inclined downward at a part bent to the first inclined surface 1211*b* so that the protrusion 1116 may be settled thereinside. Furthermore, a first groove 1116*a* may be formed to be recessed at the upper end of the protrusion 1116 so that the first base surface 1211*a* is stably entered and settled to suppress separation. The first inclined surface 1211*b* may contact the lower end of the first torque supporting protrusion 1153 by being bent and extending to be inclined upward from the first base surface 1211*a*, so that the protrusion 1116 of the outer pad plate 1115 may be elastically supported by the first torque supporting protrusion 1153 by the first elastic portion 1211.

The second elastic portion 1212 may be interposed between the lower end of the protrusion 1116 and the upper end of the second torque supporting protrusion 1154 to elastically support the protrusion 1116 on the second torque supporting protrusion 1154. Like the first elastic portion 1211, the second elastic portion 1212 may be formed by continuously being bent and extending from the lower end of the base 1215. The second elastic portion 1212 includes a second base surface 1212*a* extending forward along the lower end of the protrusion 1116 from the lower end of the base 1215, and a second inclined surface 1212*b* that is bent and extending toward the second torque supporting protrusion 1154 from the second base surface 1212*a*. The second base surface 1212*a* may extend along the lower end of the protrusion 1116, and may be partially inclined downward at a part bent to the second inclined surface 1212*b* so that the protrusion 1116 may be settled thereinside. Furthermore, a second groove 1116*b* may be formed to be recessed at the lower end of the protrusion 1116 so that the second base surface 1212*a* is stably entered and settled to suppress separation. The second inclined surface 1212*b* may contact the upper end of the second torque supporting protrusion 1154 by being bent and extending to be inclined upward from the second base surface 1212*a*, and thus the protrusion 1116 of the outer pad plate 1115 may be elastically supported by the second torque supporting protrusion 1154 by the second elastic portion 1212.

The third elastic portion 1213 is in contact with and supported by the side end of the protrusion 1116, thereby more stably supporting the outer pad spring 1210 to the protrusion 1116 of the outer pad plate 1115, and at the same time, preventing separation of the outer pad spring 1210 from the protrusion 1116. The third elastic portion 1213 may be cut and bent forwardly from the base 1215 to be in contact with and supported by the side end of the protrusion 1116. Furthermore, a third groove 1116*c* may be formed to be recessed at the side end of the protrusion 1116 so that the third elastic portion 1213 is stably entered and settled to suppress separation therebetween.

The first torque supporting protrusion 1153 and the second torque supporting protrusion 1154 may be formed to protrude from the rear surface of the caliper bridge 1150, and the outer spring seat 1152 may be formed therebetween, so that the load applied by the rotating brake disk may be withstood.

Referring to FIGS. 14 and 15, the first torque supporting protrusion 1153 may be formed to protrude from the upper side of the outer spring seat 1152, and the second torque supporting protrusion 1154 may be formed to protrude from the lower side of the outer spring seat 1152. In other words, the first torque supporting protrusion 1153 and the second torque supporting protrusion 1154 may be formed to protrude relatively for the outer spring seat 1152, and the outer spring seat 1152 may be formed to be depressed relatively for the second torque supporting protrusion 1154.

When the brake disk and the outer brake pad 1110 are in close contact with each other for braking the vehicle in a state which the wheel and the brake disk rotate in one direction (clockwise direction based on FIG. 14), a load is generated in the outer pad plate 1115 and the outer brake pad 1110 in the same direction as the rotational direction of the brake disc. In this case, because the first torque supporting protrusion 1153 on one side (left side based on FIG. 14) and the second torque supporting protrusion 1154 on the other side (right side based on FIG. 14) stably support the load applied to the outer pad plate 1115, so that a braking force of the vehicle may maintain constantly in spite of the load.

On the contrary, when the brake disk and the outer brake pad 1110 are in close contact with each other for braking the vehicle in a state which the wheel and the brake disk rotate in the other direction (counterclockwise direction based on FIG. 15), a load is generated in the outer pad plate 1115 and the outer brake pad 1110 in the same direction as the rotational direction of the brake disk. In this case, the second torque supporting protrusion 1154 on one side (left side based on FIG. 15) and the first torque supporting protrusion 1153 on the other side (right side based on FIG. 15) stably support the load applied to the outer pad plate 1115, so that the braking force of the vehicle may maintain constantly.

Hereinafter, a structure in which the inner brake pad 1120 is mounted to the carrier 1160 by the inner pad spring 1220 will be described.

FIGS. 16 and 17 are perspective and exploded perspective views respectively illustrating the carrier 1160, the inner brake pad 1120, and the inner pad spring 1220 according to the first embodiment of the disclosure. In addition, FIG. 18 is a perspective view illustrating the inner pad spring 1220 according to the first embodiment of the disclosure, and FIGS. 19 and 20 are front views illustrating the carrier 1160, the inner brake pad 1120, and the inner pad spring 1220 according to the first embodiment of the disclosure, illustrating a state in which the load is supported by first and second locking protrusions 1162 and 1163.

Referring to FIGS. 16 to 20, the inner pad spring 1220 is provided to elastically support the inner brake pad 1120 and the inner pad plate 1125 on the carrier 1160. The inner pad spring 1220 is settled and supported on the inner spring seat 1161 formed in the carrier 1160 in a state in which the inner pad spring 1220 is mounted on the protrusion 1126 formed on a side end of the inner pad plate 1125, thereby mounting and installing the inner brake pad 1120 on the carrier 1160.

The inner spring seat 1161 is formed to be recessed along the advancing and retreating directions on the carrier 1160 such that at least a part of the protrusion 1126 and the inner pad spring 1220 may be inserted and supported. The first locking protrusion 1162 may be protruded inward toward the center thereof from an upper side of the inner spring seat 1161, and the second locking protrusion 1163 may be protruded inwardly from a lower side of the inner spring seat 1161. When the brake disc and the brake pad are in close contact with each other by the first and second locking protrusions 1162 and 1163 respectively protruding from the upper and lower sides of the inner spring seat 1161, the inner spring seat 1161 may stably support the inner pad plate 1125 and the inner brake pad 1120 in spite of the load applied by wheel and the brake disc which are rotating. A detailed description thereof will be described later with reference to FIGS. 19 and 20.

The pair of inner pad springs 1220 may be provided on both sides of the inner pad plate 1125. Referring to FIG. 18, the inner pad spring 1220 may include a clip base 1225, a first anchor portion 1221 that is provided on upper side of the clip base 1215 and formed along the first locking protrusion 1162 to elastically support the protrusion 1126 to the first locking protrusion 1162, a second anchor portion 1222 provided on a lower side of the clip base 1225 to elastically support the lower end of the protrusion 1126, and a retainer portion 1223 provided on a side of the clip base 1225 to be in contact with and supported by a front surface of the protrusion 1126.

The clip base 1225 forms a main body and is provided to face or contact the side end of the protrusion 1126 on the inner pad plate 1125. The clip base 1225 may be provided in a plate shape, and the first anchor portion 1221, the second anchor portion 1222, and the retainer portion 1223 may be provided at the top, bottom, and side of the clip base, respectively by continuously cutting and bending. In other words, the inner pad spring 1220 is integrally provided as a single body, and may be manufactured by cutting and bending the anchor portions and the retainer portion 1221 to 1223 from the clip base 1225, thereby simplifying the structure and manufacturing process thereof.

The first anchor portion 1221 may be formed to extend and be bent along the first locking protrusion 1162 to elastically support the protrusion 1126 on the first locking protrusion 1162. More specifically, the first anchor portion may include a first tab 1221a interposed between the lower end of the first locking protrusion 1162 and the upper end of the protrusion 1126 1221 by extending from the upper side of the clip base 1225 to the center thereof along the upper end of the protrusion 1126, a second tab 1221b that is bent upward and extends from the first tab 1221a to face the side surface of the second locking protrusion 1163, a third tab 1221c facing the upper end of the second locking protrusion 1163 by extending from the second tab 1221b to a surrounding side thereof, at least one first tensioner 1211d formed by being bent and extending from at least one of front end and rear end of the second tab 1221b toward the surrounding side thereof, and a second tensioner 1211e that is cut and bent from the third tab 1221c toward the first locking protrusion 1162 to directly be in contact with and supported by the upper end of the first locking protrusion 1162. In this way, the first anchor portion 1221 is extended and bent from the clip base 1225 to surround a surrounding side of the first locking protrusion 1162, so that the protrusion 1126 of the inner pad plate 1125 may be elastically supported by the locking protrusion 1162.

The second anchor portion 1222 is in contact with and supported at the lower end of the protrusion 1126 to elastically support the lower end of the protrusion 1126, and at least a part of the second anchor portion 1222 may be interposed between the lower end of the protrusion 1126 and the upper end of the second locking protrusion 1163. The second anchor portion 1222 may be formed by continuously extending and being bent from the lower end of the clip base 1225. The second anchor portion 1222 is formed extending from the lower end of the clip base 1225 to the central side thereof along the lower end of the protrusion 1126, and may include a lip portion that is formed to be inclined at a certain part upward, so that the second anchor portion 1222 may elastically contact the lower end of the protrusion 1126 to elastically support the inner pad spring 1220 to the protrusion 1126.

The retainer portion 1223 is in contact with and supported by the front surface of the protrusion 1126, thereby more stably supporting the inner pad spring 1220 to the protrusion 1126 of the inner pad plate 1125, and at the same time, preventing separation of the inner pad spring 1220 from the protrusion 1126. The retainer portion 1223 may be bent and extend from the front end of the clip base 1225 toward the front surface of the protrusion 1126 to be in contact with and supported by the front surface of the protrusion 1126. Meanwhile, although not shown in the drawings, a plurality of recesses may be formed in the protrusion 1126 of the inner pad plate 1125 so that various elastic elements of the inner pad spring 1220 are stably entered and settled to suppress separation therebetween.

The first locking protrusion 1162 and the second locking protrusion 1163 may be formed to protrude along the advancing and retreating direction on the carrier 1160, and the inner spring seat 1161 may be formed therebetween, so that the load applied by the rotating brake disk may be withstood.

Referring to FIGS. 19 and 20, the first locking protrusion 1162 may be formed to protrude from the upper side of the inner spring seat 1161, and the second locking protrusion 1163 may be formed on the lower side of the inner spring seat 1161. In other words, the first locking protrusion 1162 and the second locking protrusion 1163 may be formed to protrude relatively with respect to the inner spring seat 1161, and the inner spring seat 1161 may be formed to be recessed relatively with respect to the first locking protrusion 1162 and the second locking support 1163.

When the brake disk and the inner brake pad 1120 are in close contact with each other for braking the vehicle in a state where the wheel and the brake disk rotate in one direction (clockwise direction based on FIG. 19), a load is generated in the inner pad plate 1125 and the inner brake pad 1120 in the same direction as the rotational direction of the brake disc. In this case, the first locking protrusion 1162 on one side (left side based on FIG. 19) and the second locking protrusion 1163 on the other side (right side based on FIG. 19) stably support the load applied to the inner pad plate 1125, so that the braking force of the vehicle may maintain constantly in spite of the load.

On the contrary, when the brake disk and the inner brake pad 1120 are in close contact with each other for braking the vehicle in a state which the wheel and the brake disk rotate in the other direction (counterclockwise direction based on FIG. 20), a load is generated in the inner pad plate 1125 and the inner brake pad 1120 in the same direction as the rotational direction of the brake disk. In this case, the second locking protrusion 1163 on one side (left side based on FIG. 20) and the first locking protrusion 1162 on the other side (right side based on FIG. 20) stably support the load applied to the inner pad plate 1125, so that the braking force of the vehicle may maintain consistently.

The pressing member 1130 may receive a driving force from the actuator 1270 to press the inner pad plate 1125 against the brake disc.

Referring to FIGS. 3 and 4 again, the actuator 1270 may include a motor 1271 that provides power to provide a driving force for advancing and retreating the pressing member 1130, a power transmission 1272 that converts rotational power provided from the motor 1271 into linear motion to generate forward and backward movement of the pressing member 1130, and a reducer (not shown) that decelerates the power provided from the motor 1271 to transmit the power transmission 1272, and the like.

The motor 1271 may operate by receiving power from a power supply such as a battery of the vehicle, and may generate rotational power to transmit the reducer. The reducer is a device having various structures, such as a planetary gear assembly or a worm structure, to reduce the power of the motor 1271 to transmit the power transmission 1272, and is not limited to a device having any one structure or operation method.

The power transmission 1272 may include a spindle that rotates by receiving power decelerated from the reducer, a nut provided inside the pressing member 1130 and screw-coupled to the spindle, and an anti-rotation portion (not shown) preventing rotation of the nut so that the nut and the pressing member 1130 perform linear motion without rotating. The spindle may rotate in a first direction by the power transmitted through the motor 1271 and the reducer, thereby advancing the nut and the pressing member 1130 toward the inner pad plate 1125 to perform braking of the vehicle. Furthermore, the spindle rotates in a second direction opposite to the first direction by the power transmitted through the motor 1271 and the reducer to separate the nut and the pressing member 1130 from the inner pad plate 1125, thereby releasing braking of the vehicle.

Hereinafter, operation of the caliper brake 1 according to the first embodiment of the disclosure will be described.

FIG. 21 is a lateral cross-sectional view illustrating an operating state of the caliper brake 1 according to the first embodiment of the disclosure. FIG. 21A is a cross-sectional view illustrating a pre-braking state or braking release state of the vehicle, FIG. 21B is a cross-sectional view illustrating a braking state of the vehicle.

When braking the vehicle, the pressing member 1130 advances toward the inner pad plate 1125 by the hydraulic pressure of a pressurized medium such as a brake oil or the operation of the actuator 1270, and in turn the inner pad plate 1125 and the inner brake pad 1120 are pressed toward the brake disc. The caliper housing 1140 and the caliper bridge 1150 slide together in a direction opposite to the moving direction of the pressing member 1130 by a reaction force according to the advance of the pressing member 1130, and at this time, the caliper housing 1140 and the caliper bridge 1150 are guided by sliding movement by the guide rod 1170, and the guide rod 1170 is fixedly installed on the carrier 1160 to maintain a constant position. As the caliper housing 1140 and the caliper bridge 1150 slide in the direction opposite to the moving direction of the pressing member 1130, the outer pad plate 1115 and the outer brake pad 1110 installed on the caliper bridge 1150 also move and press toward the brake disk to be close contact with each other, thereby performing braking of the vehicle. When releasing braking of the vehicle, the caliper housing 1140 and the caliper bridge 1150 are returned to their original positions by the restoration device 1180 as shown in FIG. 21A.

Hereinafter, a caliper brake 2 according to a second embodiment of the disclosure will be described.

A description of the caliper brake 2 according to the second embodiment of the disclosure to be described below is the same as the description of the caliper brake 1 according to the first embodiment of the disclosure described above, except for cases where different reference numerals are used to further describe, the description is omitted to prevent duplication of content.

FIGS. 22 and 23 are exploded perspective views in different directions illustrating the caliper brake 2 according to the second embodiment of the disclosure.

Referring to FIGS. 22 and 23, the caliper brake 2 according to the second embodiment of the disclosure may include a brake disc (not shown) that rotates together with a wheel (not shown) of the vehicle, a pair of brake pads 2110 and 2120 that dispose on opposite sides of the brake disc, a carrier 2160 fixed to the vehicle body and installed with the inner brake pad 2120, a caliper housing 2140 slidably installed on the carrier 2160, a pressing member 2130 installed on the caliper housing 2140 to be movably forward and backward, a caliper bridge 2150 that is provided with the outer brake pad 2110 and is connected to the caliper housing 2140 to be slidably movable together with the caliper housing 2140, and a guide rod 2170 that is fixed to the carrier 2160 and is connected to the caliper housing 2140 to guide a sliding movement of the caliper housing 2140 and the caliper bridge 2150 with respect to the carrier 2160, a restoration device 2180 that returns the vehicle to its original position which is a pre-braking state or a braking release state of the vehicle, and an actuator 2270 that generates and provides a driving force for operating the pressing member 2130.

The brake disc (not shown) is provided to rotate together with the wheel of the vehicle, and an inner brake pad 2120 and an outer brake pad 2110 are respectively disposed on opposite sides of the brake disk. The inner and outer brake pads 2120 and 2110 are fixedly installed on the inner and outer pad plates 2125 and 2115, respectively, and the brake pads 2110 and 2120 are respectively attached to and the inner surface (the surface facing the brake disk) of each of the pad plates 2115 and 2125. The inner pad plate 2125 is disposed so that the outer surface thereof is in contact with the pressing member 2130 to be described later, and the outer pad plate 2115 is installed on a rear surface of the caliper bridge 2150 to be described later together with the outer brake pad 2110. Accordingly, when the vehicle is braked, the pressing member 2130 advances to press the inner pad plate 2125 and the inner brake pad 2120 to the brake disc side to closely contact them, and due to a reaction force therefor, the caliper housing 2140 and the caliper bridge 2150 connected thereto slide in a direction opposite to the forward direction of the pressing member 2130 with respect to the carrier 2160 fixedly installed on the vehicle body. As a result, the outer pad plate 2115 and the outer brake pad 2110 installed on the caliper bridge 2150 may be pressed toward and closely in contact with the brake disc.

The inner pad plate 2125 and the outer pad plate 2115 may have protrusions 2116 and 2126 formed at opposite ends thereof, respectively, and an inner pad spring 2220 and an outer pad spring 2210, which will be described later, may be mounted and supported by each of the outer protrusions 2116. Each of the protrusions 2116 and 2126 may be provided with a plurality of grooves that are recessed so that a part of the pad spring to be described later is stably settled therein, and a detailed description thereof will be provided later.

The pressing member 2130 may be composed of a piston, and may be provided so as to move forward and backward inside a cylinder provided in the caliper housing 2140. The pressing member 2130 may brake the vehicle by moving forward by hydraulic pressure of the pressurized medium such as brake oil, etc. and may release braking of the vehicle by retreating. Furthermore, the pressing member 2130 may be operated electromechanically by the actuator 2270 to be described later to perform braking or parking of the vehicle by moving forward, and release the braking or parking state of the vehicle by retreating.

The caliper housing 2140 includes a cylinder in which the piston is arranged to be movably forward and backward, and a pair of guide holes 2141 passing through both sides of the cylinder in a direction parallel to the forward and backward direction of the pressing member 2130. The caliper bridge 2150 may be connected and mounted to the caliper housing 2140 by a fastening member 2250 to cover a front surface of the caliper housing 2140. Each of the guide rods 2170, which will be described later, may be inserted and passed through each of the pair of guide holes 2141, and because the guide rods 2170 are fixed to the carrier 2160, the caliper housing 2140 and the caliper bridge 2150 connected thereto may slide along the forward and backward direction.

The caliper bridge 2150 is connected and mounted to the caliper housing 2140 by the fastening member 2250, and the caliper bridge 2150 and the caliper housing 2140 may slide together with respect to the carrier 2160. The caliper bridge 2150 may be provided with the outer pad plate 2115 and the outer brake pad 2110 which are installed on the rear surface thereof, and a display 2151 to which a logo or emblem of a product or a vehicle may be applied may be provided on the front surface thereof. The display 2151 may be provided by forming at least a part thereof on the front surface of the caliper bridge 2150 to be flat.

Because the caliper bridge 2150 is connected and mounted to the caliper housing 2140, when the caliper housing 2140 slides with respect to the carrier 2160 by the guide rod 2170 to be described later, the caliper bridge 2150 also may slide together. Accordingly, when the vehicle is braked, the caliper housing 2140 and the caliper bridge 2150 slide together in the opposite direction to the moving direction of the pressing member 2130 due to the reaction force caused by the advancing of the pressing member 2130, so that the outer brake pad 2110 installed on the caliper bridge 2150 may be pressed toward and closely in contact with the brake disc. Conversely, when braking of the vehicle is released, the caliper housing 2140 is returned to its original position by the restoration device 2180, which will be described later, and the caliper bridge 2150 connected to the caliper housing 2140 also moves to its original position, so that the outer brake pad 2110 installed in the 2150 may be spaced apart from the brake disc.

Furthermore, the caliper bridge 2150 may be provided to cover the front surface of the caliper housing 2140, thereby forming the exterior of the product. The caliper bridge 2150 is provided not only to cover various components such as the brake pads 2110 and 2120 and pad plates 2115 and 2125 disposed thereinside, but also to cover the entire front surface of the caliper housing 2140. Accordingly, the caliper bridge 2150 may make appearance of the product visible from wheel or the outside of the vehicle beautiful. In particular, nowadays, appearance of the wheels and caliper seen from the outside, which are applied to high-performance or luxury vehicles, becomes a very important purchasing decision factor for consumers. Accordingly, the caliper bridge 2150 provided to cover the front surface of the caliper housing 2140 while enclosing various components and provided with the display 2151 capable of displaying a product or a brand of a vehicle on the front surface thereof may improve marketability and competitiveness of products and the applied vehicles.

A detailed description of the outer brake pad 2110, the outer pad plate 2115, and the outer pad spring 2210 which are mounted on the rear surface of the caliper bridge 2150 will be described later with reference to FIGS. 29 to 34.

The carrier 2160 may be fixedly installed to a supportable fixture such as a vehicle body by a bolt 2169 or the like. On opposite sides of the carrier 2160, the guide rods 2170 to be described later may be fixedly installed, and for this purpose, on opposite sides of the carrier 2160, coupling portions to which the guide rods 2170 are screwed may be penetrated in the forward and backward direction thereof, or may be formed to be recessed on the rear surface of 2160. To this end, a thread may be formed on an inner circumferential surface of the coupling portion. Furthermore, in the carrier 2160, the inner pad plate 2125 and an inner brake pad 2120 may be installed in a central portion adjacent to the pressing member 2130, and the inner pad spring 2220 may be mounted between the outer protrusion 2116 of the inner pad plate 2125 and the carrier 2160. A detailed description of the inner brake pad 2120, the inner pad plate 2125, and the inner pad spring 2220 which are mounted on the central of the carrier 2160 will be described later with reference to FIGS. 35 to 39.

FIG. 24 is a front view illustrating the pressing member 2130, the caliper housing 2140, the carrier 2160, and the guide rod 2170 according to the second embodiment of the disclosure, and FIG. 25 is an exploded perspective view illustrating the guide rod 2170 and the restoration device 2180 according to the second embodiment of the disclosure. Furthermore, FIG. 26 is a lateral cross-sectional view, and FIG. 27 is an enlarged view of a part C of FIG. 26.

Referring to FIGS. 22 to 27, the guide rods 2170 may be fixed to opposite sides of the carrier 2160, and provided to guide the sliding movement of the caliper housing 2140 and the caliper bridge 2150 with respect to the carrier 2160. Furthermore, the restoration device 2180 is arranged on the outer side of the guide rod 2170 to return the caliper housing 2140 and the caliper bridge 2150 to their original positions that are a pre-braking state or braking release state of the vehicle.

The guide rod 2170 may be provided in a cylindrical shape extending along the advancing and retreating direction. One side of the guide rod 2170 may be fixedly installed by being inserted and fastened to a coupling portion of the carrier 2160, and the other side of the guide rod 2170 may be arranged to insert and pass through the guide hole 2141 formed through the caliper housing 2140 in the forward and backward direction. Because the guide rod 2170 is fixed to the carrier 2160, the guide rod 2170 maintains a position together with the carrier 2160, and when the vehicle is braked or released, the caliper housing 2140 and the caliper bridge 2150 may be guided by moving forward and backward along the guide rod 2170.

As shown in FIG. 24, the guide rod 2170 may be provided on both sides of the pressing member 2130 with respect to an axial direction of the pressing member 2130. When the brake disc and the brake pad are in close contact with each other for braking of the vehicle, a load may be applied to various components such as the caliper housing 2140 and the caliper bridge 2150 by the wheel and the brake disc that are rotating, which may cause deformation of various components including the caliper housing 2140 and the caliper bridge 2150. Accordingly, since the guide rod 2170 and the guide hole 2141 are provided on both sides of the pressing member 2130, respectively, the forward and backward movement of the caliper housing 2140 and the caliper bridge 2150 may be stably induced and guided despite the load applied during braking. Although it is shown in the drawing that the pair of guide rods 2170 are provided symmetrically on both sides of the pressing member 2130, it is not limited to the corresponding position and number, and the number and position may vary depending on the weight of the vehicle or the capacity of the brake disc.

At least one sealing member 2260 for preventing an inflow of foreign substances may be interposed between an outer circumferential surface of the guide rod 2170 and an inner circumferential surface of the guide hole 2141, and the sealing member 2260 may be provided to be sealed in a receiving groove recessed on the inner circumferential surface of the guide hole 2141. However, unlike those shown in FIGS. 26 and 27, it should be understood that the receiving groove may be formed to be recessed on the outer circumferential surface of the guide rod 2170 and the sealing member 2260 is inserted and settled therein.

The guide rod 2170 may include a core portion 2171 inserting and fastening to the coupling portion of the carrier 2160, and a bush portion 2172 inserting and passing through the guide hole 2141 to face the inner circumferential surface of the guide hole 2141. The core portion 2171 may be made of a material having high rigidity so that the guide rod 2170 may be firmly fixed and supported on the carrier 2160, and may be coupled to the carrier 2160 by screw fastening. To this end, a thread may be formed on an outer circumferential surface of the front end of the core portion 2171. However, an embodiment of the disclosure is not limited thereto, and it should be understood that the core portion 2171 also may be firmly coupled to the carrier 2160 by press-fitting or welding. Furthermore, since a number of contact and friction occur between the outer circumferential surface of the bush portion 2172 and the inner circumferential surface of the guide hole 2141 due to repetition of vehicle braking, the bush portion 2172 may be made of a material resistant to wear. In other words, the core portion 2171 and the bush portion 2172 may be manufactured from two components having different materials and then assembled with each other. However, an embodiment of the disclosure is not limited thereto, and it should be understood that the guide rod 2170 may be integrally manufactured and provided with a single material that has stable rigidity but is resistant to abrasion.

The restoration device 2180 is provided to elastically support the caliper housing 2140 and the caliper bridge 2150 in a direction to return them to their original positions.

Referring to FIGS. 25 to 27, the restoration device 2180 may be provided on the outer surface of the guide rod 2170. The restoration device 2180 may include a return spring 2181 disposed along the outer circumferential surface of the guide rod 2170, and first and second supporters provided on the guide rod 2170 to support one end and the other end of the return spring 2181, respectively.

The return spring 2181 may be disposed on the outer circumferential surface of the rear side of the guide rod 2170. As an example, the return spring 2181 may be provided as a coil spring to surround the outer circumferential surface of the guide rod 2170 as shown in FIGS. 25 to 27, but is not limited to the corresponding structure. The return spring may be made of various elastic materials as long as it may be disposed on the outer circumferential surface of the guide rod 2170.

The one end of the return spring 2181 may be supported by the first supporter. More specifically, a front end of the return spring 2181 may be supported by the first supporter, and the first supporter may be provided as a retainer 2182 mounted on the outer circumferential surface of the guide rod 2170. The retainer 2182 is provided in a cylindrical shape with an empty interior, and may have a diameter larger than the outer diameters of the guide rod 2170 and the return spring 2181. A front end of the retainer 2182 is reduced radially inward to be in close contact with and fixed to the outer circumferential surface of the guide rod 2170, and the one end of the return spring 2181 may be inserted or supported. Furthermore, the retainer 2182 is expanded radially outward as it goes toward the rear thereof, so that the one end of the return spring 2181 may smoothly be entered thereinside. The retainer 2182 may be inserted and installed in a mounting hole 2142 recessed in a rear opening of the guide hole 2141.

The other end of the return spring 2181 may be supported by the second supporter. More specifically, a rear end of the return spring 2181 may be supported by the second supporter, and the second supporter may be provided as a supporting protrusion 2183 extending outward along a radial direction at the rear end on the outer circumferential surface of the guide rod 2170. The supporting protrusion 2183 may be provided integrally with the guide rod 2170, and is formed to expand outwardly from the outer circumferential surface of the bush portion 2172, so that the other end of the return spring 2181 may be in contact and supported on a front side of the supporting protrusion 2183.

The rear opening of the guide hole 2141 may be sealed by a guide cap 2190. The guide cap 2190 has an accommodating space 2191 in which at least a part of the rear end of the guide rod 2170 and the restoration device 2180 is accommodated therein, and a front end thereof may be mounted by being fastened to the caliper housing 2140. To this end, a projection protruding inward is provided on the inner circumferential surface of the guide cap 2190, and a groove to which the projection of the guide cap 2180 is inserted and fastened may be formed on a surrounding area of the rear opening of the guide hole 2141 of the caliper housing 2140. Covering the rear opening of the guide hole 2141 by the guide cap 2190 may prevent the inflow of foreign substances, and also prevent interference with external components when the guide rod 2170 and the restoration device 2180 are operated, thereby ensuring stable operation.

Hereinafter, a structure in which the outer brake pad 2110 is mounted to the caliper bridge 2150 by the outer pad spring 2210 will be described.

FIGS. 28 and 29 are perspective and exploded perspective views respectively illustrating the caliper bridge 2150, the outer brake pad 2110, and the outer pad spring 2210 according to the second embodiment of the disclosure. In addition, FIG. 30 is an enlarged view of part D of FIG. 28, FIGS. 31 and 32 are perspective and side views illustrating the outer pad spring 2210 according to the second embodiment of the disclosure. FIGS. 33 and 34 are rear views illustrating the caliper bridge 2150, the outer brake pad 2110, and the outer pad spring 2210 according to the second embodiment of the disclosure, illustrating an operating state of supporting a load by a first torque supporting protrusion 2153 and a second torque supporting protrusion 2154.

Referring to FIGS. 28 to 34, the outer pad spring 2210 is provided to elastically support the outer brake pad 2110 and the outer pad plate 2115 on the rear surface of the caliper bridge 2150. The outer pad spring 2210 settles and supports the outer protrusion 2116 formed on a side end of the outer pad plate 2115 on the outer spring seat 2152 formed on the rear surface of the caliper bridge 2150, so that the outer pad spring 2210 allows the outer brake pad 2110 to mount and install on the caliper bridge 2150.

The outer spring seat 2152 is formed to be recessed from a surrounding area on the rear surface of the caliper bridge 2150 such that at least a part of the outer protrusion 2116 and the outer pad spring 2210 may be inserted and supported. The first torque supporting protrusion 2153 may be protruded from one side of the outer spring seat 2152, and the second torque supporting protrusion 2154 may be protruded from the other side of the outer spring seat 2152. Furthermore, an outer spring fastening groove 2156 into which a fastening portion 2213 of the outer pad spring 2210, which will be described later, is inserted may be formed to be recessed in an outer surface of the first torque supporting protrusion 2153, so that the outer pad spring 2210 is more firmly supported on the caliper bridge 2150 and at the same time, separation of the outer pad spring 2210 from the caliper bridge 2150 may be prevented effectively.

The outer spring seat 2152 is formed on the rear surface of the caliper bridge 2150 and is not formed through or perforated, so that the outer spring seat 2152 may not be exposed on the front surface of the caliper bridge 2150 forming the exterior of the caliper brake 2. Furthermore, when the brake disc and the brake pads are in close contact with each other by the first torque supporting protrusions 2153 and the second torque supporting protrusions 2154 respectively protruding rearward on the one side and the other side of the outer spring seat 2152, the outer spring seat 2152 may stably support the outer pad plate 2115 and the outer brake pad 2110 despite the load applied by wheel and the brake disc which are rotating. A detailed description thereof will be described later with reference to FIGS. 33 and 34.

The pair of outer pad springs 2210 may be provided on opposite ends of the outer pad plate 2115. Referring to FIGS. 31 to 32, the outer pad spring 2210 may include a base 2219, a first elastic portion 2221 that is provided on an upper side of the base 2219 and interposed between an upper end of the outer protrusion 2216 and an lower end of the first torque supporting protrusion 2153 to elastically support the outer protrusion 2116 on the first torque supporting protrusion 2153, a second elastic portion 2212 that is provided on the upper side of the base 2219 and is contacting the side surface of the outer pad plate 2115 to elastically support the outer pad plate 2115, a fastening portion 2213 that is provided on an outer end of the base 2219 and is inserted into the outer spring fastening groove 2156 to stably support the base 2219 on the caliper bridge 2150, a first protection portion 2214 interposed between the outer protrusion 2116 and the first torque supporting protrusion 2153 to prevent contact between the outer protrusion 2116 and the first torque supporting protrusion 2153 to reduce wear and noise, a second protection portion 2215 interposed between the outer pad plate 2115 and the first torque supporting protrusion 2154 to prevent contact between the outer pad plate 2115 and the second torque supporting protrusion 2154 to reduce wear and noise, a removal portion 2216 separating the fastening portion 2213 from the outer spring fastening groove 2156, and a support surface 2217 supporting additionally the base 2219 on the outer protrusion 2116.

The base 2219 forms a main body and is provided to face or contact the rear surface of the outer protrusion 2116 of the outer pad plate 2115. The base 2219 may be provided in a plate shape, and the first elastic portion 2211, the second elastic portion 2212, the fastening portion 2213, and the first protection portion 2214, the second protection portion 2215, the removal portion 2216, and the support surface 2217, etc., which will be described later, may be provided at the top, bottom, and side ends of the base, respectively by continuously cutting and bending. In other words, the outer pad spring 2210 is provided integrally as a single body, and the first elastic portion 2211, the second elastic portion 2212, the fastening portion 2213, the first protection portion 2214, the second protection portion 2215, the removal portion 2216, and the support surface 2217 from the base 2219 may be manufactured by cutting and bending, thereby simplifying structure and manufacturing process thereof.

The first elastic portion 2211 may be interposed between the upper end of the outer protrusion 2116 and the lower end of the first torque supporting protrusion 2153 to elastically support the outer protrusion 2116 on the first torque supporting protrusion 2153. The first elastic portion 2211 may be formed by continuously extending and bending from the upper end of the base 2219. More specifically, the first elastic portion 2211 may include a base surface 2211a extending forward along the upper end of the outer protrusion 2116 from the upper end of the base 2219, and a inclined surface 2211b that is bent and extending toward the first torque supporting protrusion 2153 from the base surface 2211a. The base surface 2211a may extend along the upper end of the outer protrusion 2116, and may be partially inclined downward at a part bent to the inclined surface s211b so that the outer protrusion 2116 may be settled thereinside. Furthermore, a first groove 2116a may be formed to be recessed at the upper end of the outer protrusion 2116 so that the base surface 2211a is stably entered and settled to suppress separation. The inclined surface 2211b may contact the lower end of the first torque supporting protrusion 2153 by being bent and extending to be inclined upward from the base surface 2211a, so that the outer protrusion 2116 of the outer pad plate 2115 may be elastically supported by the first torque supporting protrusion 2153 by the first elastic portion 2211.

The second elastic portion 2212 may be provided to contact and support the outer pad plate 2115 to elastically support the outer pad plate 2115. The second elastic portion may be formed by continuously being bent and extending from the upper end of the base 2219. More specifically, the second elastic portion 2212 may be bent and extended from the upper end of the base 2219 toward an upper side of the outer protrusion 2116 on the side surface of the outer pad plate 2115. The second elastic portion 2212 may be formed to expend along the side surface of the outer pad plate 2115 so that a contact area thereof may be enlarged. In other words, an angle or extension direction of the second elastic portion 2212 may correspond to the side angle or shape of the outer pad plate 2115. The second elastic portion 2212 may elastically support the outer pad plate 2115 more stably by contacting and pressing on the upper side of the outer protrusion 2116 on the side surface of the outer pad plate 2115.

On the other hand, at the end opposite to the upper end of the base 2219 where the first elastic portion 2211 and the second elastic portion 2212 are provided, the support surface 2217 for additionally supporting the base 2219 to the outer protrusion 2116 may be formed by bending and extending. The support surface 2217 may be bent and extended forward along the lower end of the outer protrusion 2116 from the lower end of the base 2219. As such, since the support surface 2217 is in close contact with the lower end of the outer protrusion 2116, the outer pad spring 2210 may be stably mounted and maintained on the outer protrusion 2116. A second groove 2116*b* may be formed to be recessed at the lower end of the outer protrusion 2116 so that the support surface 2217 is stably entered and settled to suppress separation.

The fastening portion 2213 is provided to stably fasten and support the outer pad spring 2210 on the caliper bridge 2150. The fastening portion 2213 may be formed by continuously extending and bending from the side end of the base 2219. More specifically, the fastening portion 2213 is formed to extend forward along the side end of the outer protrusion 2116 from the side end of the base 2219, and a fastening tab 2213*a* inserted and mounted in the fastening groove 2156 recessed in the outward surface of the first torque supporting protrusion 2153 may be formed to be cut and bent. The fastening tab 2213*a* is extended toward an inner side of the outer spring fastening groove 2156 to be inserted and mounted in the outer spring fastening groove 2156, so that the outer pad spring 2210 may be stably fastened and supported on the caliper bridge 2150.

The fastening tab 2213*a* of the fastening portion 2213 may be separated from the outer spring fastening groove 2156 by the removal portion 2216. The removal portion 2216 may include a removal guide surface 2216*a* bent and extended from the fastening portion 2213 in the direction opposite to the extending direction of the fastening tab 2213*a* and a gripping surface 2216*b* that is bent and extended rearward from the removal guide surface 2216*a*. The removal guide surface 2216*a* may extend from an end of the fastening portion 2213 toward an outward direction opposite to the extending direction of the fastening tab 2213*a*, and the gripping surface 2216*b* may be bent and extended toward the rear thereof so that a user's fingers or tools may be smoothly supported. Accordingly, when the outer pad spring 2210 is to be removed from the caliper bridge 2150 for replacement or repair of the outer brake pad 2110, the fastening tab 2213*a* inserted and mounted in the outer spring fastening groove 2156 may be easily separated by the removal portion 2216 to allow the components to be quickly disassembled or detachable, thereby becoming easier maintenance of the product.

The protection portions 2214 and 215 are interposed between the outer pad plate 2115 and the torque supporting protrusions 2153 and 2154, respectively to reduce wear, damage, or noise that are generated by direct contact between the outer pad plate 2115 and the torque supporting protrusions 2153 and 2154. The first protection portion 2214 may be interposed between the outer protrusion 2116 and the first torque supporting protrusion 2153, and the second protection portion 2215 may be interposed between the side surface of the outer pad plate 2115 and the second torque supporting protrusion 2154. More specifically, the first protection portion 2214 may be formed by bending and extending forward along the lower end of the first torque supporting protrusion 2153 from the upper end of the base 2219. Accordingly, the first protection portion 2214 may be interposed between the upper end of the outer protrusion 2116 and the lower end of the first torque supporting protrusion 2153, and may be provided to be in contact with the lower end of the first torque supporting protrusion 2153 to prevent the outer protrusion 2116 and the first torque supporting protrusion 2153 from coming into direct contact. The second protection portion 2215 may be formed by continuously extending and bending from the lower end of the base 2219 along the lower portion of the outer protrusion 2216 on the side surface of the outer pad plate 2115. Accordingly, the second protection portion 2215 may be interposed between the side surface of the outer pad plate 2115 and the inner surface of the second torque supporting protrusion 2154, so that direct contact between the outer pad plate 2115 and the second torque supporting protrusion 2154 may be suppressed.

The first torque supporting protrusion 2153 and the second torque supporting protrusion 2154 are formed to protrude on the rear surface of the caliper bridge 2150, and the outer spring seat 2152 may be formed therebetween. Therefore, the load applied by the rotating brake disc may be withstood.

Referring to FIGS. 33 and 34, the first torque supporting protrusion 2153 may be formed to protrude from the upper side of the outer spring seat 2152, and the second torque supporting protrusion 2154 may be formed to protrude from the lower side of the outer spring seat 2152. In other words, the first torque supporting protrusion 2153 and the second torque supporting protrusion 2154 may be formed to protrude relatively with respect to the outer spring seat 2152, and the outer spring seat 2152 may be formed to be recessed relatively with respect to the second torque supporting protrusion 2154.

When the brake disk and the outer brake pad 2110 are in close contact with each other for braking the vehicle in a state which the wheel and the brake disk rotate in one direction (clockwise direction based on FIG. 33), a load is generated in the outer pad plate 2115 and the outer brake pad 2110 in the same direction as the rotational direction of the brake disc. In this case, because the first torque supporting protrusion 2153 on one side (left side based on FIG. 33) and the second torque supporting protrusion 2154 on the other side (right side based on FIG. 33) stably support the load applied to the outer pad plate 2115, so that a braking force of the vehicle may maintain constantly in spite of the load.

On the contrary, when the brake disk and the outer brake pad 2110 are in close contact with each other for braking the vehicle in a state which the wheel and the brake disk rotate in the other direction (counterclockwise direction based on FIG. 34), a load is generated in the outer pad plate 2115 and the outer brake on the pad 2110 in the same direction as the rotational direction of the brake disk. In this case, the second torque supporting protrusion 2154 on one side (left side based on FIG. 34) and the first torque supporting protrusion 2153 on the other side (right side based on FIG. 34) stably support the load applied to the outer pad plate 2115, so that the braking force of the vehicle may maintain constantly.

Hereinafter, a structure in which the inner brake pad 2120 is mounted to the carrier 2160 by the inner pad spring 2220 will be described.

FIGS. 35 and 36 are perspective and exploded perspective views respectively illustrating the carrier 2160, the inner brake pad 2120, and the inner pad spring 2220 according to the second embodiment of the disclosure. In addition, FIG. 37 is a perspective view illustrating the inner pad spring 2220 according to the second embodiment of the disclosure, and FIGS. 38 and 39 are front views illustrating the carrier 2160, the inner brake pad 2120, and the inner pad spring 2220 according to the second embodiment of the disclosure, illustrating a state in which the load is supported by first and second locking protrusions 2162 and 2163.

Referring to FIGS. 35 to 39, the inner pad spring 2220 is provided to elastically support the inner brake pad 2120 and the inner pad plate 2125 on the carrier 2160. The inner pad spring 2220 is settled and supported on the inner spring seat 2161 formed on the carrier 2160 in a state in which the inner pad spring 2220 is mounted on the inner protrusion 2126 formed on a side end of the inner pad plate 2125, thereby mounting and installing the inner brake pad 2120 on the carrier 2160.

The inner spring seat 2161 is formed to be recessed along the advancing and retreating directions on the carrier 2160 such that at least a part of the inner protrusion 2126 and the inner pad spring 2220 may be inserted and supported. The first locking protrusion 2162 may be protruded inward toward the center thereof from an upper side of the inner spring seat 2161, and the second locking protrusion 2163 may be formed to protrude inwardly from a lower side of the inner spring seat 2161. When the brake disc and the brake pad are in close contact with each other by the first and second locking protrusions 2162 and 2163 respectively protruding from the upper and lower sides of the inner spring seat 2161, the inner spring seat 2161 may stably support the inner pad plate 2125 and the inner brake pad 2120 in spite of the load applied by wheel and the brake disc which are rotating. A detailed description thereof will be described later with reference to FIGS. 38 and 39.

The pair of inner pad springs 2220 may be provided on both sides of the inner pad plate 2125. Referring to FIG. 37, the inner pad spring 2220 may include a clip base 2225, a first anchor portion 2221 that is provided on upper side of the clip base 2215 and formed along the first locking protrusion 2162 to elastically support the inner protrusion 2126 to the first locking protrusion 1162, a second anchor portion 2222 provided on a lower side of the clip base 2225 to elastically support the lower end of the inner protrusion 2126, and a retainer portion 2223 provided on a side of the clip base 2225 to be in contact with and supported by a front surface of the inner protrusion 2126.

The clip base 2225 forms a main body and is provided to face or contact the side end of the inner protrusion 2126 on inner pad plate 2125. The clip base 2225 may be provided in a plate shape, and the first anchor portion 2221, the second anchor portion 2222, and the retainer portion 2223 may be provided at the top, bottom, and side of the clip base, respectively by continuously cutting and bending. In other words, the inner pad spring 2220 is integrally provided as a single body, and may be manufactured by cutting and bending the anchor portions 2221 and 222 and the retainer portion 2223 from the clip base 2225, thereby simplifying the structure and manufacturing process thereof.

The first anchor portion 2221 may be formed to extend and be bent along the first locking protrusion 2162 to elastically support the inner protrusion 2126 on the first locking protrusion 2162. The first anchor portion 2221 may include a first tab 2221a interposed between the lower end of the first locking protrusion 2162 and the upper end of the inner protrusion 2126 by extending from the upper side of the clip base 2225 to the center thereof along the upper end of the inner protrusion 2126, a second tab 2221b that is bent upward and extends from the first tab 2221a to face the side surface of the second locking protrusion 2163, a third tab 2221c facing the upper end of the first locking protrusion 2162 by extending from the second tab 2221b to a surrounding side thereof, at least one first tensioner 2211d formed by being bent and extending from at least one of front end and rear end of the second tab 2221b toward the surrounding side thereof, and a second tensioner 2211e that is cut and bent from the third tab 2221c toward the first locking protrusion 2162 to directly be in contact with and supported by the upper end of the first locking protrusion 2162. In this way, the first anchor portion 2221 is extended and bent from the clip base 2225 to surround a surrounding side of the first locking protrusion 2162, so that the inner protrusion 2126 of the inner pad plate 2125 may be elastically supported by the locking protrusion 2162.

The second anchor portion 2222 is in contact with and supported at the lower end of the inner protrusion 2126 to elastically support the lower end of the inner protrusion 2126, at least a part of the second anchor portion 2222 may be interposed between the lower end of the inner protrusion 2126 and the upper end of the second locking protrusion 2163. The second anchor portion 2222 may be formed by continuously extending and bending from the lower end of the clip base 2225. The second anchor portion 2222 is formed extending from the lower end of the clip base 2225 to the central side thereof along the lower end of the inner protrusion 2126, and may include a lip portion that is formed to be inclined at a certain part upward, so that the second anchor portion 2222 may elastically contact the lower end of the inner protrusion 2126 to elastically support the inner pad spring 2220 to the inner protrusion 2126.

The retainer portion 2223 is in contact with and supported by the front surface of the inner protrusion 2126, thereby more stably supporting the inner pad spring 2220 to the inner protrusion 2126 of the inner pad plate 2125, and at the same time, preventing separation of the inner pad spring 2220 from the inner protrusion 2126. The retainer portion 2223 may be bent and extended from the front end of the clip base 2225 toward the front surface of the inner protrusion 2126 to be in contact with and supported by the front surface of the inner protrusion 2126. Meanwhile, although not shown in the drawings, a plurality of grooves may be formed to be recessed in the inner protrusion 2126 of the inner pad plate 2125 so that the load applied by the rotating brake disk may be withstood.

Referring to FIGS. 38 and 39, the first locking protrusion 2162 may be formed to protrude from the upper side of the inner spring seat 2161, and the second locking protrusion 2163 may be formed on the lower side of the inner spring seat 2161. In other words, the first locking protrusion 2162 and the second locking protrusion 2163 may be formed to protrude relatively with respect to the inner spring seat 2161, and the inner spring seat 2161 may be formed to be recessed relatively with respect to the first locking protrusion 2162 and the second locking support 2163.

When the brake disk and the inner brake pad 2120 are in close contact with each other for braking the vehicle in a state which the wheel and the brake disk rotate in one direction (clockwise direction based on FIG. 38), a load is generated in the inner pad plate 2125 and the inner brake pad 2120 in the same direction as the rotational direction of the brake disc. In this case, the first locking protrusion 2162 on one side (left side based on FIG. 38) and the second locking protrusion 2163 on the other side (right side based on FIG. 38) stably support the load applied to the inner pad plate 2125, so that the braking force of the vehicle may maintain constantly in spite of the load.

On the contrary, when the brake disk and the inner brake pad 2120 are in close contact with each other to brake the vehicle in a state which the wheel and the brake disk rotate in the other direction (counterclockwise direction based on FIG. 39), a load is generated in the inner pad plate 2125 and the inner brake pad 2120 in the same direction as the rotational direction of the brake disk. In this case, the second locking protrusion 2163 on one side (left side based on FIG. 39) and the first locking protrusion 2162 on the other side (right side based on FIG. 39) stably support the load applied to the inner pad plate 2125, so that the braking force of the vehicle may maintain consistently.

The pressing member 2130 may receive a driving force from the actuator 2270 to press the inner pad plate 2125 against the brake disc.

Referring to FIGS. 22 and 23 again, the actuator 2270 may include a motor 2271 that provides power to provide a driving force for advancing and retreating the pressing member 2130, a power transmission 2272 that converts rotational power provided from the motor 2271 into linear motion to generate forward and backward movement of the pressing member 2130, and a reducer (not shown) that decelerates the power provided from the motor 2271 to transmit the power transmission 2272, and the like.

The motor 2271 may operate by receiving power from a power supply such as a battery of the vehicle, and may generate rotational power to transmit the reducer. The reducer is a device having various structures, such as a planetary gear assembly or a worm structure, to reduce the power of the motor 2271 to transmit the power transmission 2272, and is not limited to a device having any one structure or operation method.

The power transmission 2272 may include a spindle that rotates by receiving power decelerated from the reducer, a nut provided inside the pressing member 1130 and screw-coupled to the spindle, and an anti-rotation portion (not shown) preventing rotation of the nut so that the nut and the pressing member 2130 perform linear motion without rotating. The spindle may rotate in a first direction by the power transmitted through the motor 2271 and the reducer, thereby advancing the nut and the pressing member 2130 toward the inner pad plate 2125 to perform braking of the vehicle. Furthermore, the spindle rotates in a second direction opposite to the first direction by the power transmitted through the motor 2271 and the reducer to separate the nut and the pressing member 2130 from the inner pad plate 2125, thereby releasing braking of the vehicle.

Hereinafter, operation of the caliper brake 2 according to the second embodiment of the disclosure will be described.

FIG. 40 is a lateral cross-sectional view illustrating an operating state of the caliper brake 2 according to the second embodiment of the disclosure. FIG. 40A is a cross-sectional view illustrating a pre-braking state or braking release state of the vehicle, FIG. 40B is a cross-sectional view illustrating a braking state of the vehicle.

When the vehicle is braked, the pressing member 2130 advances toward the inner pad plate 2125 by hydraulic pressure of a pressurized medium such as brake oil or the operation of the actuator 2270, and in turn the inner pad plate 2125 and the inner brake pad 2120 are pressed toward the brake disc. The caliper housing 2140 and the caliper bridge 2150 slide together in a direction opposite to the moving direction of the pressing member 2130 by a reaction force according to the advance of the pressing member 2130. At this time, the guide rod 2170 is fixedly installed on the carrier 2160 to maintain a constant position, and the caliper housing 2140 and the caliper bridge 2150 are guided by sliding movement by the guide rod 2170. As the caliper housing 2140 and the caliper bridge 2150 slide in the direction opposite to the moving direction of the pressing member 2130, the outer pad plate 2115 and the outer brake pad 2110 installed on the caliper bridge 2150 also move and press against the brake disk to be close contact with each other, thereby performing braking of the vehicle. When braking of the vehicle is released, the caliper housing 2140 and the caliper bridge 2150 are returned to their original positions by the restoration device 2180 as shown in FIG. 40A.

As is apparent from the above, embodiments of the disclosure may provide the caliper brake capable of simplifying part structures and appearance.

Further, the embodiments of the disclosure may provide the caliper brake capable of lowering manufacturing cost and improving productivity by reducing the number of parts.

Further, the embodiments of the disclosure may provide the caliper brake capable of achieving a beautiful appearance in spite of applying the actuator having the motor.

Further, the embodiments of the disclosure may provide the caliper brake capable of stably braking the vehicle in various operating situations without installing additional parts.

Further, the embodiments of the disclosure may provide the caliper brake capable of reducing the size and volume of a product, thereby improving applicability of a vehicle, and promoting space utilization of the vehicle.

Further, the embodiments of the disclosure may provide the caliper brake with a simple structure and easy maintenance.

Further, the embodiments of the disclosure may provide the caliper brake capable of improving marketability and competitiveness of a vehicle.

As described above, the exemplary embodiments of the disclosure have thus far been described with reference to accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. A caliper brake, comprising:

a brake disc rotating with a wheel of a vehicle;

an inner brake pad and an outer brake pad respectively disposed on opposite sides of the brake disc;

a pressing member configured to press the inner brake pad against the brake disc;

a caliper housing in which the pressing member is movable forward and backward;

a caliper bridge connected to the caliper housing and configured to press the outer brake pad against the brake disc by a reaction force in response to operation of the pressing member;

a carrier fixed to a body of the vehicle;

at least one guide rod fixed to the carrier and guiding sliding movement of the caliper housing and the caliper bridge with respect to the carrier, at least one inner pad spring configured to elastically support the inner brake pad and an inner pad plate on which the inner brake pad is fixedly installed;

at least one outer pad spring configured to elastically support the outer brake pad on a rear surface of the caliper bridge, wherein each of the at least one inner pad spring is mounted on a corresponding inner pad plate protrusion formed on a respective side end of the inner pad plate, wherein each of the at least one inner pad spring comprises: a clip base configured to face or contact a side end of the corresponding inner pad plate protrusion on the inner pad plate, a first anchor portion provided on an upper side of the clip base, and a second anchor portion provided on a lower side of the clip base to elastically support a lower end of the corresponding inner pad plate protrusion, wherein the caliper bridge is configured to surround the outer brake pad and cover a front surface of the caliper housing, wherein the caliper bridge further comprises:

an outer spring seat that is recessed from a surrounding area on the rear surface, and on which at least a part of the outer pad spring is settled and supported, a first torque supporting protrusion protruding from one side of the outer spring seat to contact and support one side of the outer pad spring, a second torque supporting protrusion protruding from the other side of the outer spring seat to contact and support the other side of the outer pad spring, and an outer spring fastening groove recessed on an outer surface of the first torque supporting protrusion to support the outer pad spring, wherein the outer pad spring is configured to be mounted on a protrusion formed at a side end of an outer pad plate on which the outer brake pad is fixedly installed, and at least a part of the protrusion is settled and accommodated in the outer spring seat, wherein the outer pad spring further comprises:

a first elastic portion interposed between an upper end of the protrusion and a lower end of the first torque supporting protrusion to elastically support the protrusion, a second elastic portion provided to be in contact with a side surface of the outer pad plate to elastically support the outer pad plate, and a fastening portion inserted into the outer spring fastening groove.

2. The caliper brake of claim 1, wherein the caliper housing includes a guide hole that is formed through in the forward and backward direction of the pressing member, and the at least one guide rod extends along the forward and backward direction and provided to be inserted and passed through the guide hole.

3. The caliper brake of claim 2, wherein the at least one guide rod includes a core portion fixed to the carrier, and a bush portion facing the guide hole.

4. The caliper brake of claim 2, further comprising a restoration device configured to elastically support the caliper housing and the caliper bridge in a direction to return to original positions with respect to the carrier, wherein the restoration device is provided on an outer surface of the guide rod.

5. The caliper brake of claim 1, wherein the caliper bridge includes a display, at least a part of the display is formed in a flat so that a logo or emblem may be applied on a front surface thereof.

6. The caliper brake of claim 1, wherein the outer pad spring further comprises:

a first protection portion interposed between the protrusion and the first torque supporting protrusion to prevent contact between the protrusion and the first torque supporting protrusion, and a second protection portion interposed between the outer pad plate and the second torque supporting protrusion to prevent contact between the outer pad plate and the second torque supporting protrusion.

7. The caliper brake of claim 6, wherein the outer pad spring further comprises a base disposed to face a rear surface of the protrusion, the first protection portion is formed to extend forward along the lower end of the first torque supporting protrusion from the upper end of the base, and is interposed between the upper end of the protrusion and the lower end of the first torque supporting protrusion.

8. The caliper brake of claim 7, wherein the second protection portion is formed to extend from the lower end of the base along a lower side of the protrusion on a side surface of the outer pad plate, and is interposed between the lower side of the protrusion on the side surface of the outer pad plate and an inner surface of the second torque supporting protrusion.

9. The caliper brake of claim 1, wherein the outer pad spring further comprises a base disposed to face a rear surface of the protrusion, and the first elastic portion is formed to be extended and bent from an upper end of the base, and the second elastic portion is formed to be bent and extended from the upper end of the base toward an upper side of the protrusion on a side surface of the outer pad plate, wherein the first elastic portion further comprises:

a base surface extending forward along the upper end of the protrusion from the upper end of the base, and an inclined surface bent and extended from the base surface toward the first torque supporting protrusion.

10. The caliper brake of claim 1, wherein the outer pad spring further comprises a base disposed to face a rear surface of the protrusion, and the fastening portion is formed to be bent and extended from a side end of the base forward, and includes a fastening tab bent and extended toward an inner side of the outer spring fastening groove.

11. The caliper brake of claim 10, wherein the outer pad spring further comprises a removal portion configured to separate the fastening tab from the outer spring fastening groove, and the removal portion includes a removal guide surface extending from the fastening portion in a direction opposite to an extending direction of the fastening tab.

12. The caliper brake of claim 1, wherein the guide rod is provided with a pair thereof on both sides with respect to an axial direction of the pressing member.

* * * * *